US011912886B2

(12) United States Patent
Pearson et al.

(10) Patent No.: US 11,912,886 B2
(45) Date of Patent: Feb. 27, 2024

(54) MULTI-COAT POLYMER PHOTONIC CRYSTAL FILMS

(71) Applicant: Colorado State University Research Foundation, Fort Collins, CO (US)

(72) Inventors: Ryan Michael Pearson, Berkeley, CA (US); Matthew David Ryan, Berkeley, CA (US); Garret Miyake, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 888 days.

(21) Appl. No.: 16/964,463

(22) PCT Filed: Jan. 30, 2020

(86) PCT No.: PCT/US2020/015928
§ 371 (c)(1),
(2) Date: Jul. 23, 2020

(87) PCT Pub. No.: WO2020/160299
PCT Pub. Date: Aug. 6, 2020

(65) Prior Publication Data
US 2021/0230444 A1   Jul. 29, 2021

Related U.S. Application Data

(60) Provisional application No. 62/799,945, filed on Feb. 1, 2019.

(51) Int. Cl.
| | |
|---|---|
| C09D 133/10 | (2006.01) |
| C09D 155/00 | (2006.01) |
| C09D 7/61 | (2018.01) |
| C09D 7/41 | (2018.01) |
| C09D 4/00 | (2006.01) |
| C09D 5/00 | (2006.01) |
| C09D 175/14 | (2006.01) |
| C09D 181/02 | (2006.01) |
| G02B 1/00 | (2006.01) |
| B29D 11/00 | (2006.01) |
| C08F 299/04 | (2006.01) |
| C09D 153/00 | (2006.01) |

(52) U.S. Cl.
CPC .... *C09D 155/005* (2013.01); *B29D 11/00865* (2013.01); *C08F 299/0485* (2013.01); *C09D 4/00* (2013.01); *C09D 5/002* (2013.01); *C09D 7/41* (2018.01); *C09D 7/61* (2018.01); *C09D 133/10* (2013.01); *C09D 153/00* (2013.01); *C09D 175/14* (2013.01); *C09D 181/02* (2013.01); *G02B 1/005* (2013.01); *Y10T 428/2848* (2015.01)

(58) Field of Classification Search
None
See application file for complete search history.

(56) References Cited

U.S. PATENT DOCUMENTS

| | | | |
|---|---|---|---|
| 6,479,592 B2 | 11/2002 | Rheinberger et al. | |
| 7,251,402 B2 * | 7/2007 | Akiyama | G02B 1/115 385/125 |
| 9,382,387 B2 | 7/2016 | Xia et al. | |
| 9,453,943 B2 * | 9/2016 | Miyake | G02F 1/0054 |
| 2007/0289119 A1 | 12/2007 | Lee et al. | |
| 2013/0324666 A1 | 12/2013 | Xia et al. | |
| 2014/0243483 A1 | 8/2014 | Grubbs et al. | |
| 2016/0068669 A1 | 3/2016 | Macfarlane et al. | |
| 2016/0289392 A1 | 10/2016 | Grubbs et al. | |
| 2018/0067393 A1 | 3/2018 | Weitekamp | |
| 2018/0094099 A1 | 4/2018 | Johnson et al. | |
| 2018/0223034 A1 | 8/2018 | Char et al. | |
| 2018/0258230 A1 | 9/2018 | Grubbs et al. | |
| 2019/0085118 A1 | 3/2019 | Lee et al. | |
| 2021/0363378 A1 * | 11/2021 | Ryan | C09D 155/005 |

FOREIGN PATENT DOCUMENTS

WO    2012124693 A1    9/2012

OTHER PUBLICATIONS

Yan Xia et al., "Efficient Synthesis of Narrowly Dispersed Brush Copolymers and Study of Their Assemblies: The Important Side Chain Arrangement", Nov. 30, 2009, Jouranal of American Chemical Society, vol. 131, pp. 18525-18532 (Year: 2009).*
Extended Search Report of the EPO dated Mar. 13, 2023 in EP Application No. 20748208.4; 7pgs.
Song et al., "Thermally Tunable Metallodielectric Photonic Crystals from the Self-Assembly of Brush Block Copolymers and Gold Nanoparticles", Adv. Optical Mater. 2015, Jan. 1, 2015, vol. 3, No. 9, pp. 1169-1175.
Verduzco et al., "Structure, function, self-assembly, and applications of bottlebrush copolymers", Chem. Soc. Rev., 2015, 44, pp. 2405-2420.
Alfrey et al., "Physical Optics of Iridescent Multilayered Plastic Films," Polym Sci Eng., 9(6):400-404, Nov. 1969.
Chang et al., "Design, Synthesis, and Self-Assembly of Polymers with Tailored Graft Distributions," J Am Chem Soc., 139(48):17683-17693, Nov. 2017.

(Continued)

*Primary Examiner* — Anish P Desai
(74) *Attorney, Agent, or Firm* — Haukaas Fortius PLLC; Michael Haukaas

(57) ABSTRACT

Polymer composite photonic crystal materials are disclosed as coatings and topcoats which have high reflection (>30%) in a specific range of the electromagnetic spectrum, such as ultraviolet (<400 nm), visible (Vis, 400 nm-700 nm), or near-infrared radiation range (NIR, 700-2000 nm), and relatively low reflection (<20% reflection) in a second, different range of the electromagnetic spectrum. Surprisingly, it was found that through a formulation and additives approach, the optical properties of polymer composite photonic crystal films can be selectively modified from a variety of different coating methods, including spray deposition.

19 Claims, 10 Drawing Sheets

(56) References Cited

OTHER PUBLICATIONS

Chantakit et al., "Ultra-High Green Light Transparency Coating on 1D Photonic Crystal Structure," Siam Physics Congress 2017 (SPC2017), J Phys. Conference Series, 901(1):012150, Sep. 2017.
Edrington et al., "Polymer-Based Photonic Crystals," Adv Mater., 13(6):421-425, Mar. 2001.
International Search Report and Written Opinion of the ISA/US in PCT/US2020/015927, dated Oct. 7, 2020; 9pgs.
International Search Report and Written Opinion of the ISA/US in PCT/US2020/015928, dated May 26, 2020; 10pgs.
Krogman et al., "Industrial-Scale Spray Layer-by-Layer Assembly for Production of Biomimetic Photonic Systems," Bioinspir Biomim., 8(4):045005, Dec. 2013.
Liberman-Martin et al., "Application of Bottlebrush Block Copolymers as Photonic Crystals," Macromol Rapid Commun., 38(13):1700058, May 2017.
Macfarlane et al., "Improving Brush Polymer Infrared One-Dimensional Photonic Crystals via Linear Polymer Additives," J Am Chem Soc., 136(50):17374-17377, Dec. 2014, Supporting Information.
Macfarlane et al., "Improving Brush Polymer Infrared One-Dimensional Photonic Crystals via Linear Polymer Additives," J Am Chem Soc., 136(50):17374-17377, Dec. 2014.
Müller et al., "Dye-Containing Polymer Beads as Photonic Crystals," Chem Mater., 12(8):2508-2512, Abstract, Aug. 2000.
Radford et al., "Reflectivity of Iridescent Coextruded Multilayered Plastic Films," Polym Sci Eng., 13(3):216-221, May 1973.
Runge et al., "Synthesis of High Molecular Weight Comb Block Copolymers and Their Assembly into Ordered Morphologies in the Solid State," J Am Chem Soc., 129(34):10551-10560, Aug. 2007.
Schrenk et al., "Some Physical Properties of Multilayered Films," Polym Eng Sci., 9(6):393-399, Nov. 1969.
Sveinbjörnsson et al., "Rapid Self-Assembly of Brush Block Copolymers to Photonic Crystals," Proc Natl Acad Sci USA, 109(36):14332-14336, Sep. 2012.
Takiguchi, "PIndustrial Application of Three-Dimensional Colloidal Photonic Crystals Made in Space," International Symposium on Advanced Nanodevices and Nanotechnology, J Physics Conference Series, 109:012004, Jan. 2008.
Extended Search Report and Written Opinion of the European Patent Office dated Mar. 13, 2023 in EP Application No. 20766785.8; 8pgs.
Song et al., "Hierarchical Photonic Pigments via the Confined Self-Assembly of Bottlebrush Block Copolymers" ACS Nano 2019, Jan. 8, 2019, 13, pp. 1764-1771.

* cited by examiner

MULTI-COAT POLYMER PHOTONIC CRYSTAL FILMS

RELATED APPLICATIONS

This application is a National Stage filing under 35 U.S.C. § 371 of International Application No. PCT/US2020/015928, filed Jan. 30, 2020, which claims priority under 35 U.S.C. § 119(e) to U.S. Provisional Patent Application No. 62/799,945 filed Feb. 1, 2019, which applications are incorporated herein by reference.

GOVERNMENT SUPPORT

This invention was made with government support under Grant No. DE-AR0000881 and DE-AE0001261 awarded by the Department of Energy. The government has certain rights in the invention.

BACKGROUND OF THE INVENTION

Photonic crystals (PCs) are highly ordered structures composed of materials of differing dielectric constants with a periodicity similar to the wavelengths of light reflected. PCs have found use in thin film optics, reflective coatings on lenses or mirrors, and waveguides. PCs can be made through top down approaches such as lithography, atomic layer deposition or etching. More recently bottom up approaches have been realized through self-assembly mechanisms using colloidal crystals or block copolymers. While top-down approaches provide precise control over the architecture, bottom up approaches offer the advantage of providing an inexpensive means to achieve similar structures and enable rapid prototyping and deposition on a variety of surfaces.

Towards an end use application, the challenge of having a robust and transparent photonic crystal coating accessed through a bottom-up strategy still persists. Through self-assembly, it is common that with or without specialized annealing processes, irregularities and errors in the nanoscale morphology are formed. These irregularities, of a large enough size, can result in the phenomena of light scattering as well as inhomogeneous surface features.

The current state of the art is represented by multilayer extruded thin films (U.S. Pat. Nos. 6,208,466 and 6,696,142) or layer-by-layer deposited metal oxide nanoparticles or polyelectrolytes (*Bioinspir. Biomim.* 2013, 8, 045005 and US Patent Application Publication No. 2014/0218792). Both of these approaches require significant investment in advanced manufacturing instrumentation/infrastructure and techniques, in addition to potential high material costs. The reflective properties inherent to the disclosed material are established in a bottom-up process through the self-assembly of BCPs that occur rapidly under easily accessible conditions, i.e. ambient or slightly elevated temperature, atmospheric pressure, and in the presence of oxygen. The self-assembly process avoids the need for specialized manufacturing techniques such as nano-imprint or electron-beam lithography, and layer-by-layer deposition. The polymeric building blocks, polymeric additives, and non-polymeric additives employed in the coating are inexpensive, and in preferred embodiments can be "commodity" materials, maintaining low material cost.

Current approaches for the preparation of reflective materials require significant investment in advanced manufacturing instrumentation and techniques and high material costs.

Accordingly, there is a need for alternative compositions that allow for more cost-effective preparation of reflective materials and coatings.

SUMMARY

The disclosure relates to the discovery that the use of inorganic/organic composite materials composed of brush block copolymers (BBCPs) and either inorganic, organic, or some combination of the two, families of additives can allow for modification of the optical features of photonic crystal materials, such as but not limited to: percent reflection (% R), wavelength (nm) of maximum reflection ($\lambda_{max}$), and full width at half maximum (FWHM) of the reflection peaks, and haze (% haze) of the overall material.

Accordingly, this disclosure provides a multilayer coating comprising:
  a) a first layer of a photonic crystal film comprising a pigment and brush block copolymer (BBCP) of Formula IA or Formula IB:

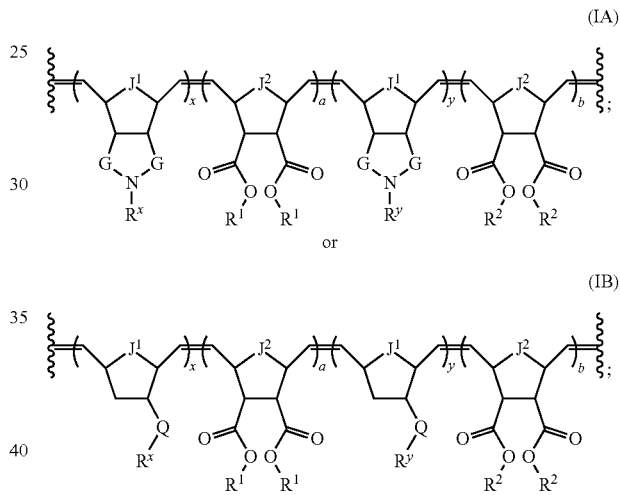

wherein
  $R^x$ is —$(C_2$-$C_6)$alkyl-OC(=O)$G^1$ wherein $G^1$ comprises polyacrylate, polymethacrylate or polylactic acid;
  $R^y$ is —$(C_1$-$C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
  $R^1$ is unbranched alkyl;
  $R^2$ is branched alkyl;
  $J^1$ and G are each independently $CH_2$ or C=O;
  each $J^2$ is independently $CH_2$ or C=O;
  each Q is independently alkyl, cycloalkyl, heterocycloalkyl, aryl, or heteroaryl;
  a and b are each independently 0 to about 1000; and
  x and y are each independently 1 to about 1000;
  wherein blocks a, b, x and y are in any order, the ratio of x:a is 1:0 to about 1:3, and the ratio of y:b is 1:0 to about 1:3; and
  b) a second layer comprising a topcoat wherein the topcoat is an optical adhesive or ultraviolet curable resin;
  wherein the first layer and second layer form a multilayer film and the multilayer coating comprises one or more multilayer films.

This disclosure also provides a method for modulating an electromagnetic radiation reflectance, absorbance and transmission profile of a substrate comprising coating a substrate with a multilayer coating according to photonic crystal film above, wherein the pigment in the photonic crystal film modulates the reflectance, absorbance and transmission profile of the substrate and at least 5% more electromagnetic radiation is reflected by the coated substrate than for a corresponding uncoated substrate.

Also, this disclosure provides a method for reducing haze of a substrate comprising coating a substrate with a multilayer coating wherein the multilayer coating comprises:
 a) a first layer of a photonic crystal film and a pigment; and
 b) a second layer comprising a topcoat wherein the topcoat is an optical adhesive or ultraviolet curable resin;
wherein the first layer modulates the reflectance, absorbance and transmission profile of the substrate wherein at least 5% more electromagnetic radiation is reflected by the coated substrate than for a corresponding uncoated substrate, and the second layer reduces haze of the reflected electromagnetic radiation by at least 5% compared to the corresponding uncoated substrate.

Additionally, this disclosure provides a method for forming a multilayer coating comprising:
 a) combining a solvent, a pigment and a brush block copolymer (BBCP) to form a mixture, wherein BBCP is a BBCP of Formula IC:

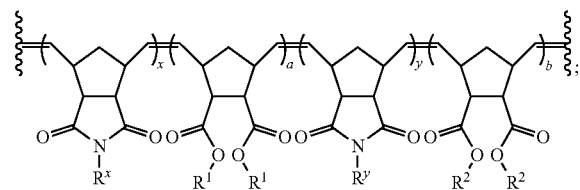

(I)

wherein
 $R^x$ is —$(C_2\text{-}C_6)$alkyl-OC(=O)$G^1$ wherein $G^1$ comprises polyacrylate, polymethacrylate or polylactic acid;
 $R^y$ is —$(C_1\text{-}C_8)$alkyl-$G^2$-$G^3$ wherein $G^2$ is —C(=O)O— or a nitrogen heterocycle, and $G^3$ comprises polystyrene, polyacrylate, polydimethylsiloxane, polyether, polymethacrylate, or polylactic acid;
 $R^1$ is unbranched alkyl;
 $R^2$ is branched alkyl;
 a and b are each independently 0 to about 1000; and
 x and y are each independently 1 to about 1000;
wherein the ratio of x:a is 1:0 to about 1:3 and the ratio of y:b is 1:0 to about 1:3;
 b) applying a first layer of the mixture to a substrate;
 c) drying the first layer to form a film; and
 d) applying a second layer comprising a topcoat to the film wherein the topcoat is an optical adhesive or ultraviolet curable resin;
 wherein the film and second layer form the multilayer coating on the substrate.

The invention provides novel compositions comprising of Formulas I-III disclosed herein, intermediates for the synthesis of polymers of Formulas I-III, as well as methods of preparing compositions comprising polymers of Formulas I-III. The invention also provides polymers of Formulas I-III that are useful as intermediates for the synthesis of other useful polymers and compositions. The invention provides for the use of polymers of Formulas I-III for the manufacture of reflective coatings.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
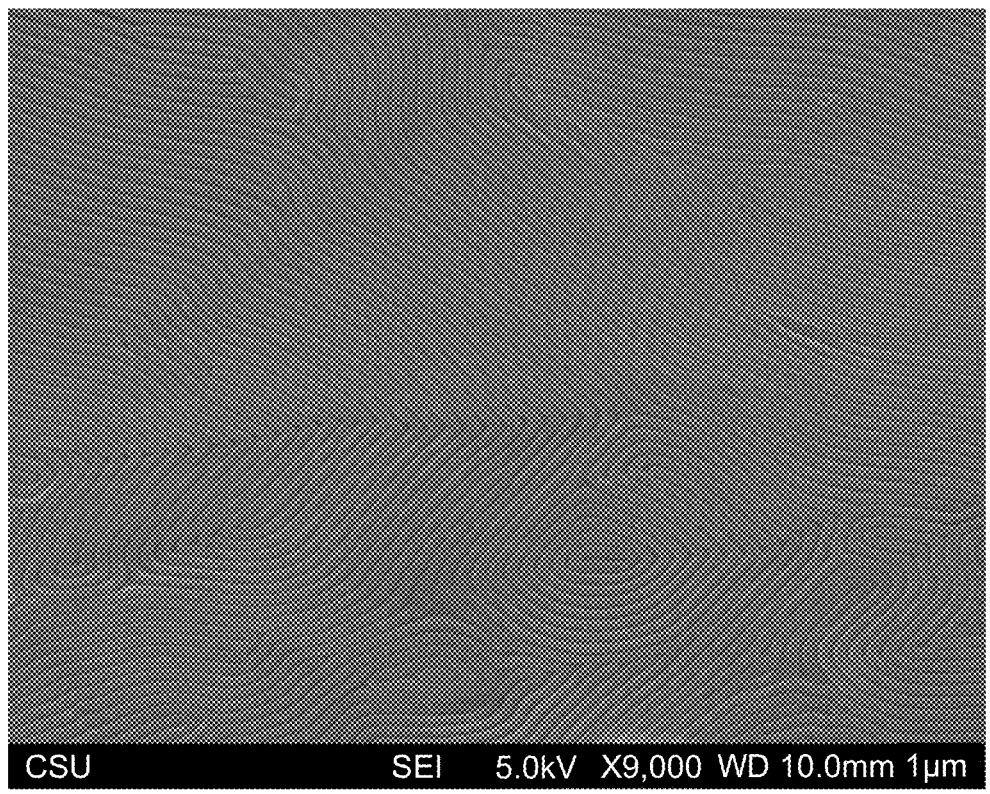
FIG. 1. SEM image showing the errors in the lamellae propagating through the photonic crystal film composed of self-assembled poly(lactic acid)-b-poly(styrene).

This application relates to the discovery that the use of inorganic/organic composite materials composed of block copolymers (BCPs) and either inorganic, organic, or some combination of the two families of additives can allow for modification of the optical features of photonic crystal materials, such as but not limited to: percent reflection (% R), wavelength (nm) of maximum reflection ($\lambda_{max}$), full width at half maximum (FWHM) of the reflection peaks, and haze (% haze) of the resulting photonic crystal material.

Specifically, BCPs composed of a variety of monomeric units are blended with either inorganic additives, small molecule organic additives, and/or polymeric additives to modulate the relative intensities of the higher-order reflection peaks; in some instances, resulting in high NIR reflection and low is reflection. The use of exogenous additives to directly modulate the relative intensities of the higher order reflection peaks for BCP derived photonic crystal materials is unique in its approach and allows for the deployment of these materials in applications necessitating selective reflection and transmission in different ranges of the electromagnetic spectrum.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit. For example, one or more substituents on a phenyl ring refers to one to five, or one to four, for example if the phenyl ring is disubstituted.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the endpoints of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2. 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983);

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J. Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano. Additionally, non-limiting examples of substituents that can be bonded to a substituted carbon (or other) atom include F, Cl, Br, I, OR', OC(O)N(R')$_2$, CN, CF$_3$, OCF$_3$, R', O, S, C(O), S(O), methylenedioxy, ethylenedioxy, N(R')$_2$, SW, SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include both alkenyl and alkynyl groups. The alkyl can be a monovalent hydrocarbon radical, as described and exemplified above, or it can be a divalent hydrocarbon radical (i.e., an alkylene).

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "heterocycloalkyl" refers to a saturated or partially saturated monocyclic, bicyclic, or polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered. Examples of suitable heterocycloalkyl substituents include pyrrolidyl, tetrahydrofuryl, tetrahydrothiofuranyl, piperidyl, piperazyl, tetrahydropyranyl, morpholino, 1,3-diazapane, 1,4-diazapane, 1,4-oxazepane, and 1,4-oxathiapane. The group may be a terminal group or a bridging group.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. In other embodiments, the aryl group can have 6 to 60 carbons atoms, 6 to 120 carbon atoms, or 6 to 240 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted.

The term "heteroaryl" refers to a monocyclic, bicyclic, or tricyclic ring system containing one, two, or three aromatic rings and containing at least one nitrogen, oxygen, or sulfur atom in an aromatic ring. The heteroaryl can be unsubstituted or substituted, for example, with one or more, and in particular one to three, substituents, as described in the definition of "substituted". Typical heteroaryl groups contain 2-20 carbon atoms in the ring skeleton in addition to the one or more heteroatoms. Examples of heteroaryl groups include, but are not limited to, 2H-pyrrolyl, 3H-indolyl, 4H-quinolizinyl, acridinyl, benzo[b]thienyl, benzothiazolyl, β-carbolinyl, carbazolyl, chromenyl, cinnolinyl, dibenzo[b, d]furanyl, furazanyl, furyl, imidazolyl, imidizolyl, indazolyl, indolisinyl, indolyl, isobenzofuranyl, isoindolyl, isoquinolyl, isothiazolyl, isoxazolyl, naphthyridinyl, oxazolyl, perimidinyl, phenanthridinyl, phenanthrolinyl, phenarsazinyl, phenazinyl, phenothiazinyl, phenoxathiinyl, phenoxazinyl, phthalazinyl, pteridinyl, purinyl, pyranyl, pyrazinyl, pyrazolyl, pyridazinyl, pyridyl, pyrimidinyl, pyrrolyl, quinazolinyl, quinolyl, quinoxalinyl, thiadiazolyl, thianthrenyl, thiazolyl, thienyl, triazolyl, tetrazolyl, and xanthenyl. In one embodiment the term "heteroaryl" denotes a monocyclic aromatic ring containing five or six ring atoms containing carbon and 1, 2, 3, or 4 heteroatoms independently selected from non-peroxide oxygen, sulfur, and N(Z) wherein Z is absent or is H, O, alkyl, aryl, or $(C_1-C_6)$alkylaryl. In some embodiments, heteroaryl denotes an ortho-fused bicyclic heterocycle of about eight to ten ring atoms derived therefrom, particularly a benz-derivative or one derived by fusing a propylene, trimethylene, or tetramethylene diradical thereto.

A "solvent" as described herein can include water or an organic solvent. Examples of organic solvents include hydrocarbons such as toluene, xylene, hexane, and heptane; chlorinated solvents such as methylene chloride, chloroform, and dichloroethane; ethers such as diethyl ether, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Other examples of a solvent include a halogenated aromatic compound or halogenated phenyl compound such as a fluorinated or polyfluorinated phenyl compound, for example 4-chlorobenzotrifluoride. Solvents may be used alone or two or more of them may be mixed for use to provide a "solvent system".

The phrase "one or more" is readily understood by one of skill in the art, particularly when read in context of its usage. For example, one or more substituents on a phenyl ring refers to one to five, or one to up to four, for example if the phenyl ring is disubstituted. One or more subunits (i.e., repeat units or blocks) of a polymer can refer to about 5 to about 100,000, or any number of subunits.

Substituents of the compounds and polymers described herein may be present to a recursive degree. In this context, "recursive substituent" means that a substituent may recite another instance of itself. Because of the recursive nature of such substituents, theoretically, a large number may be present in any given claim. One of ordinary skill in the art of organic chemistry understands that the total number of such substituents is reasonably limited by the desired properties of the compound intended. Such properties include, by of example and not limitation, physical properties such as molecular weight, solubility or log P, application properties such as activity against the intended target, and practical properties such as ease of synthesis. Recursive substituents are an intended aspect of the invention. One of ordinary skill in the art of organic chemistry understands the versatility of such substituents. To the degree that recursive substituents are present in a claim of the invention, the total number in the repeating unit of a polymer example can be, for example, about 1-50, about 1-40, about 1-30, about 1-20, about 1-10, or about 1-5.

The term, "repeat unit", "repeating unit", or "block" as used herein refers to the moiety of a polymer that is repetitive. The repeat unit may comprise one or more repeat units, labeled as, for example, repeat unit x, repeat unit y, repeat unit a, repeat unit b, etc. Repeat units x, y, a, and b, for example, may be linked in any order and covalently bound together to form a combined repeat unit. Monomers or a combination of one or more different monomers can be combined to form a (combined) repeat unit of a polymer or copolymer. The term "molecular weight" for the copolymers disclosed herein refers to the average number molecular weight (Mn). The corresponding weight average molecular weight (Mw) can be determined from other disclosed parameters by methods (e.g., by calculation) known to the skilled artisan.

The copolymers disclosed herein can comprise random or block copolymers. However, the copolymers of Formula I described herein is random copolymer, as shown by the "r" over the bond between the x and x–a units of the copolymer (as would be readily recognized by the method of preparation of the copolymers as described, for example, in Example 4). Thus, the arrangement of the x units and x–a units is random throughout the length of the copolymer of the Formula I, and the total number of x units and x–a units is defined by x and a of Formula I, randomly arranged along the length of the copolymer.

In various embodiments, the ends of the copolymer (i.e., the initiator end or terminal end), is a low molecular weight moiety (e.g. under 500 Da), such as, H, OH, OOH, $CH_2OH$, CN, $NH_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

Self-assembly is a process in which a disordered system of pre-existing components forms an organized structure or pattern because of specific, local interactions among the components themselves, without external direction. For molecular self-assembly, initially, at small molecular density on the surface, adsorbate molecules form either a disordered mass of molecules or form an ordered two-dimensional "lying down phase", and at higher molecular coverage, over a period of minutes to hours, begin to form three-dimensional crystalline or semi-crystalline structures on the substrate surface. The "head groups" assemble on the substrate, while the tail groups assemble far from the substrate. Areas of close-packed molecules nucleate and grow until the surface of the substrate is covered in a single monolayer.

A brush block copolymer molecule is a special form of a branched polymer that comprises a main chain with linear, unbranched side chains. The brushes are often characterized by the high density of grafted chains. The limited space then leads to a strong extension of the chains. Branching occurs by the replacement of a substituent, e.g., a hydrogen atom, on a monomer subunit, by another covalently bonded chain of that polymer; or, in the case of a graft copolymer, by a chain of another type. Branching may result from the formation of carbon-carbon or various other types of covalent bonds. Branching by ester and amide bonds is typically by a condensation reaction.

The term "pigment" is used interchangeably with dye. A pigment is a material such as a solid, solution or liquid that changes the color of reflected or transmitted light as the result of wavelength-selective absorption. The pigment or dye is an organic compound, organometallic compound or inorganic compound.

A substrate can be any material which is coated with the composition disclosed herein. For example, a substrate can be a glass, metal, alloy, polymer, composite, wood, dried paint, or a surface of any kind.

The following abbreviations have their usual meaning to the skilled artisan: Đ=dispersity, kDa=kilodalton, $M_n$=number-average molecular weight, $M_W$=weight average molecular weight.

EMBODIMENTS OF THE INVENTION

This disclosure provides a multilayer coating comprising:
a) a first layer of a photonic crystal film comprising a pigment or dye and a brush block copolymer (BBCP) of Formula IA or Formula IB:

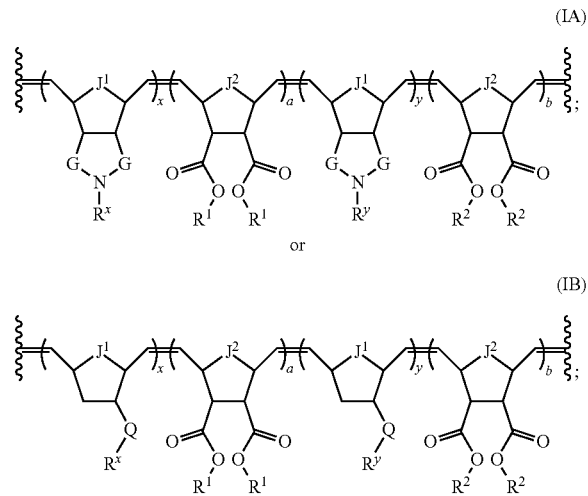

wherein
$R^x$ is —$(C_2$-$C_6)$alkyl-OC(=O)$G^1$ wherein $G^1$ comprises polyacrylate, polymethacrylate or polylactic acid;
$R^y$ is —$(C_1$-$C_8)$alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
$R^1$ is unbranched alkyl;
$R^2$ is branched alkyl;
$J^1$ and G are each independently $CH_2$ or C=O;
each $J^2$ is independently $CH_2$ or C=O;
each Q is independently alkyl, cycloalkyl, heterocycloalkyl, aryl, or heteroaryl;
a and b are each independently 0 to about 1000; and
x and y are each independently 1 to about 1000;
wherein blocks a, b, x and y are in any order, the ratio of x:a is 1:0 to about 1:3, and the ratio of y:b is 1:0 to about 1:3; and
b) a second layer comprising a topcoat wherein the topcoat is an optical adhesive or ultraviolet curable resin;
wherein the first layer and second layer form a multilayer film and the multilayer coating comprises one or more multilayer films.

In some embodiments, the topcoat comprises a Sigma-Aldrich UV curable resin (topcoat A), Forms lab Clear resin (RS-F2-GPCL-04, e.g., topcoat B), or Norland Optical Adhesives 68TH (topcoat C) or 13825 (topcoat D). See topcoats in Example 3. In various other embodiments, the nitrogen heterocycle is a triazole or a heterocycle disclosed above.

In various embodiments, the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, Azin dye, indophenol dye, oxazin dye, oxazone dye, thiazine dye, thiazole dye, safranin dye, xanthene dye, perylene diimide dye, rhodamine dye, or combination thereof. In some additional embodiments, the pigment or dye is, but is not limited to, acridine, bromothymol, carmine, Eosin Y, Guaiazulene, perylene, or a combination thereof.

In other embodiments, a and b are each independently 1-300, 5-50, 50-100, 100-150, 150-200, 200-250, 250-300, 300-400, 400-500, 500-600, 600-700, 700-800, 800-900, 900-1000, or 1000-2000. In other embodiments, x and y are each independently 1-300, 5-50, 50-100, 100-150, 150-200, 200-250, 250-300, 300-400, 400-500, 500-600, 600-700, 700-800, 800-900, 900-1000, or 1000-2000. In additional embodiments, the ratio of x:a is about 1:0.5 to about 1:1, 1:1.5, 1:2, or 1:2.5. In yet other embodiments, the ratio of y:b is about 1:0.5 to about 1:1, 1:1.5, 1:2, or 1:2.5.

In further embodiments, the composition reflects a blue color, green, orange color, red color, or reflects wavelengths at near infrared. In various embodiments, BBCP has a number average molecular weight of about 500 kDa to about 4000 kDa.

In some embodiments, the compositions are characterized by the blue color in compositions comprising Formulas I or II when $M_n$=1110.3 kDa, $M_W$=1196.1 kDa, Đ=1.08, and a=x=y=b=about 164. Preferably a=x=y=b=140-180 in some embodiments. More preferably a=x=y=b=150-170 in other embodiments.

In some embodiments, the compositions are characterized by the green color in compositions comprising Formulas I or II when $M_n$=1275.7 kDa, $M_W$=1403.2 kDa, Đ=1.10, and a=x=y=b=about 179. Preferably a=x=y=b=160-190 in some embodiments. More preferably a=x=y=b=165-185 in other embodiments.

In some embodiments, the compositions are characterized by the orange color in compositions comprising Formulas I or II when $M_n$=1795.3 kDa, $M_w$=2010.4 kDa, Đ=1.12, and a=x=y=b=about 252. Preferably a=x=y=b=230-270 in some embodiments. More preferably a=x=y=b=240-260 in other embodiments.

In some embodiments, the compositions are characterized by the wavelengths reflected at near infrared in compositions comprising Formulas I or II when $M_n$=2063.1 kDa, $M_w$=2384.8 kDa, Đ=1.16, and a=x=y=b=about 289. Preferably a=x=y=b=270-300 in some embodiments. More preferably a=x=y=b=275-295 in other embodiments.

In various other embodiments, the weight percent of BBCP is about 90% to about 99.9% and the weight percent of the pigment or dye is about 0.1% to about 10%. In some embodiments, the weight percent of BBCP is about 85%, 91%, 92%, 93%, 94%, 95%, 96%, 97%, 98% or 99%. In yet other embodiments, the weight percent of the pigment or dye is about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10% or 15%.

In additional embodiments, the composition further comprises a metal oxide, a linear polymer additive, or a combination thereof. In some embodiments, the linear polymer additive is linear poly(methacrylate), linear polylactic acid, linear polystyrene, or a combination thereof. In yet some other embodiments, the composition further comprises zirconium dioxide nanocrystals, titanium oxide, or hafnium oxide.

In further embodiments, the BBCP of Formula I is a BBCP of Formula IC or Formula II:

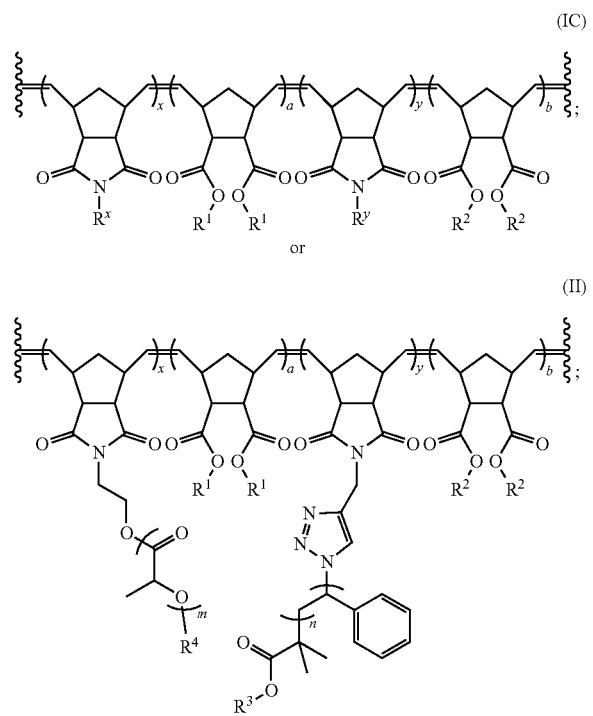

wherein $R^3$ and $R^4$ are each independently H or unbranched or branched —$(C_1\text{-}C_6)$alkyl; and m and n are each independently 1 to about 100.

In other embodiments, m and n are each independently 1-10, 10-50, 10-20, 20-30, 30-40, 40-50, or 50-100.

This disclosure additionally provides a method for reducing haze of a substrate comprising coating a substrate with a multilayer coating wherein the multilayer coating comprises:
a) a first layer of a photonic crystal film and a pigment; and
b) a second layer comprising a topcoat wherein the topcoat is an optical adhesive or ultraviolet curable resin;
wherein the first layer modulates the reflectance, absorbance and transmission profile of the substrate wherein at least 5% more electromagnetic radiation is reflected by the coated substrate than for a corresponding uncoated substrate, and the second layer reduces haze of the reflected electromagnetic radiation by at least 5% compared to the corresponding uncoated substrate. In some embodiments, the first layer comprises a BBCP of Formula IA, Formula IB, Formula II, or Formula IC.

In some embodiments, about 5% to about 25%, about 25% to about 50%, about 50% to about 75%, or about 75% to about 95%, more electromagnetic radiation is reflected by the coated substrate than for a corresponding uncoated substrate. In other embodiments, haze of the reflected electromagnetic radiation is reduced by about 5% to about 10%, about 10% to about 20%, about 20% to about 30%, about 30% to about 40%, about 40% to about 50%, about 50% to about 75%, or about 75% to about 95% compared to the corresponding uncoated substrate.

Also, this disclosure provides a method for modulating an electromagnetic radiation reflectance, absorbance and transmission profile of a substrate comprising coating a substrate with a multilayer coating according to the compositions disclosed herein, wherein the pigment or dye in the photonic crystal film modulates the reflectance, absorbance and transmission profile of the substrate and at least 5% more electromagnetic radiation is reflected by the coated substrate than for a corresponding uncoated substrate.

In various embodiments, the photonic crystal film has an optical thickness f-ratio of about 0.25 to about 0.55, or an f-ratio of about 0.1, 0.2, 0.3, 0.4, 0.5, 0.6, 0.7, 0.8, or 0.9.

In some embodiments, the reflectance, absorbance and transmission profile of the substrate comprises reflected electromagnetic radiation at wavelengths of about 280 nanometers to about 400 nanometers. In other embodiments, the reflectance, absorbance and transmission profile of the substrate comprises reflected electromagnetic radiation at wavelengths of about 400 nanometers to about 700 nanometers. In yet other embodiments, the reflectance, absorbance and transmission profile of the substrate comprises reflected electromagnetic radiation at wavelengths of about 700 nanometers to about 1400 nanometers.

In further embodiments, the reflectance, absorbance and transmission profile of the substrate comprises reflected electromagnetic radiation at wavelengths of about 200 nm to about 300 nm, about 300 nm to about 400 nm, about 400 nm to about 500 nm, about 500 nm to about 600 nm, about 600 nm to about 700 nm, about 700 nm to about 800 nm, about 800 nm to about 900 nm, about 900 nm to about 1000 nm, about 1000 nm to about 1100 nm, about 1100 nm to about 1200 nm, about 1200 nm to about 1300 nm, about 1300 nm to about 1400 nm, or about 1400 nm to about 1550 nm, or to about 1600 nm.

Additionally, this disclosure provides a method for forming a multilayer coating comprising:

a) combining a solvent, a pigment or dye, and a brush block copolymer (BBCP) to form a mixture, wherein BBCP is a BBCP of Formula IA, Formula IB, or Formula II above, or Formula IC:

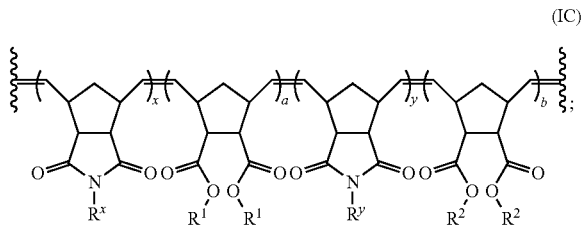

wherein $R^x$ is —$(C_2-C_6)$alkyl-OC(=O)$G^1$ wherein $G^1$ comprises polyacrylate, polymethacrylate or polylactic acid;

$R^y$ is —$(C_1-C_8)$alkyl-$G^2$-$G^3$ wherein $G^2$ is —C(=O)O— or a nitrogen heterocycle, and $G^3$ comprises polystyrene, polyacrylate, polydimethylsiloxane, polyether, polymethacrylate, or polylactic acid;

$R^1$ is unbranched alkyl;

$R^2$ is branched alkyl;

a and b are each independently 0 to about 1000; and x and y are each independently 1 to about 1000;

wherein the ratio of x:a is 1:0 to about 1:3 and the ratio of y:b is 1:0 to about 1:3;

b) applying a first layer of the mixture to a substrate;

c) drying the first layer to form a film; and d) applying a second layer comprising a topcoat to the film wherein the topcoat is an optical adhesive or ultraviolet curable resin;

wherein the film and second layer form the multilayer coating on the substrate.

In some embodiments, the solvent is 4-chlorobenzotrifluoride. In various embodiments, the method comprises a BBCP of Formula II or Formula III as described above. In other embodiments, the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof. In additional embodiments, the pigment or dye is, but is not limited to, acridine, bromothymol, carmine, Eosin Y, Guaiazulene, perylene, or a combination thereof.

In further embodiments, the pigment or dye has a weight percent of about 0.1% to about 3% in the mixture, or about 0.1%, 0.2%, 0.3%, 0.4%, 0.5%, 0.6%, 0.7&, 0.8%, 0.9%, 1%, 1.5%, 2.0%, 2.5%, 3.0%, 4%, 5% or 10% in the mixture. In other embodiments, BBCP has a weight percent of about 10% to about 30% in the mixture, or about 1%, 5%, 10%, 15%, 20%, 25%, 30% or 40% in the mixture.

In various other embodiments of the composition and method, BBCP has a number average molecular weight of about 500 kDa to about 4000 kDa, or about 900 kDa to about 1100 kDa. In other embodiments, BBCP has a number average molecular weight of about 100 kDa, 200 kDa, 300 kDa, 400 kDa, 500 kDa, 600 kDa, 700 kDa, 800 kDa, 900 kDa, 1000 kDa, 1100 kDa, 1200 kDa, 1300 kDa, 1400 kDa, 1500 kDa, 1600 kDa, 1700 kDa, 1800 kDa, 1900 kDa, 2000 kDa, 2100 kDa, 2200 kDa, 2300 kDa, 2400 kDa, 2500 kDa, 2600 kDa, 2700 kDa, 2800 kDa, 2900 kDa, 3000 kDa, 3500 kDa, 4000 kDa, or 4500 kDa.

In yet other embodiments of the above method, step a) further comprises addition to the mixture of a metal oxide, a linear polymer additive, or a combination thereof. In various embodiments, the linear polymer additive is linear poly(methacrylate), linear polylactic acid, linear polystyrene, or a combination thereof. In additional embodiments of the above method, applying the first layer and applying the second layer comprises, but is not limited to, spray deposition of the first layer and the second layer, or other methods of deposition disclosed herein, for example, draw-down coating, slot die coating, screen printing, spray deposition, or paintbrush/roller of the mixture to the substrate.

Various aspects of this disclosure include:

Photonic crystal materials containing either an inorganic or organic additive(s), involving the addition of at least one inorganic or organic component to a polymer-based photonic crystal or an organic additive composed of a different monomeric unit compared to the composition of the polymeric components.

The photonic crystal is formed from a linear block polymer, brush block polymer, star polymer, polymeric colloidal crystalline array, or any repeating dielectric structure.

The polymer is assembled or manufactured into spheres, cylinders, gyroids, lamellae or any periodic structure accessible by polymer self-assembly.

The polymer composite photonic crystal material, or solely the brush block copolymer is deposited via draw down, wire bar, doctor blade, or bird bar.

The polymer composite photonic crystal material, or solely the brush block copolymer is deposited via by paint brush or roller application.

The polymer composite photonic crystal material, or solely the brush block copolymer is deposited via screen printing.

The polymer composite photonic crystal material, or solely the brush block copolymer is deposited via dip coating.

The polymer composite photonic crystal material, or solely the brush block copolymer is deposited via hydrographic printing.

The polymer composite photonic crystal material, or solely the brush block copolymer is deposited via spray brush, spray gun, or other spray application methods including but not limited to air-atomized, airless, electrostatic, high-volume, low-pressure.

The photonic crystal coating has high near-infrared reflection and low visible reflection.

The photonic crystal coating has high visible reflection and low ultraviolet reflection.

The inorganic component is a nano-scale form (including molecular complexes and particulates in general) of alkali (earth) metals.

The inorganic component is a nano-scale form (including molecular complexes and particulates in general) of Group IV metals such as titanium, zirconium, hafnium, and/or their oxides, or combinations of any elements with Group IV metals and/or oxides.

The inorganic component is a nano-scale form (including molecular complexes and particulates in general) of Group V metals such as vanadium, niobium, and tantalum and/or their oxides, or combinations of any elements with Group V metals and/or oxides.

The inorganic component is a nano-scale form (including molecular complexes and particulates in general) of Group VI metals such as chromium, molybdenum, and tungsten and/or their oxides, or combinations of any elements with Group VI metals and/or oxides.

The inorganic component is a nano-scale form (including molecular complexes and particulates in general) of Group VII metals such as manganese, technetium, and rhenium and/or their oxides, or combinations of any elements with Group VII metals and/or oxides.

The inorganic component is a nano-scale form (including molecular complexes and particulates in general) of Group VIII metals such as iron, ruthenium, and osmium and/or their oxides, or combinations of any elements with Group VIII metals and/or oxides.

The inorganic component is a nano-scale form (including molecular complexes and particulates in general) of Group IX metals such as cobalt, rhodium, and iridium and/or their oxides, or combinations of any elements with Group IX metals and/or oxides.

The inorganic component is a nano-scale form (including molecular complexes and particulates in general) of Group X metals such as nickel, palladium, and platinum and/or their oxides, or combinations of any elements with Group X metals and/or oxides.

The inorganic component is a nano-scale form (including molecular complexes and particulates in general) of Group XI metals such as copper, silver, and gold and/or their oxides, or combinations of any elements with Group XI metals and/or oxides.

The inorganic component is a nano-scale form (including molecular complexes and particulates in general) of Group XII metals such as zinc, cadmium, and mercury and/or their oxides, or combinations of any elements with Group XII metals and/or oxides.

The inorganic component is functionalized with a surface ligand. If the inorganic component is functionalized with a surface ligand, the inorganic component can be functionalized with a surface polymer-based ligand.

The organic or inorganic additive component has a refractive index greater or less than 0.05 from the homopolymer that would be derived from the monomeric unit(s) that compose the BCP.

The organic or inorganic additive component is used to change the f value of the composition to 0.50±0.03.

The organic or inorganic additive component is used to change the f value of the composition to 0.33±0.03.

The inorganic or organic additive is a dye.

The inorganic or organic additive is a pigment.

The inorganic or organic additive absorbs ultra-violet A or B light (280-400 nm).

The inorganic or organic additive changes the absorption or transmission profile of the photonic crystal in the ultra-violet A or B light range (280-400 nm).

The inorganic or organic additive absorbs visible light (400-700 nm).

The inorganic or organic additive changes the absorption or transmission profile of the photonic crystal in the visible light range (400-700 nm).

The inorganic or organic additive absorbs near infrared, IR-A, light range (700-1400 nm).

The inorganic or organic additive changes the absorption or transmission profile of the photonic crystal in the near infrared, IR-A, light range (700-1400 nm).

The disclosed composition of a photonic crystal film with a laminate or resin topcoat.

The disclosed composition wherein the resin is photocurable.

The disclosed composition wherein the resin is thermally curable.

The disclosed composition wherein the resin is curable at ambient conditions.

The disclosed composition wherein the crosslinking mechanism of the resin uses any of the following chemical functionality but not limited to acrylates, cyano-acrylates, methacrylates, acrylamides, thiols, compounds containing a terminal sp2 hybridized carbon, isocyanates, epoxides, urethanes, siloxanes and/or silanes.

The disclosed method wherein the photonic crystal is formed through a bottom-up fashion.

The disclosed method wherein the photonic crystal is formed through self-assembly.

The disclosed method wherein the photonic crystal is composed of polymeric materials.

The disclosed method wherein the photonic crystal is composed of a block copolymer.

The disclosed method wherein the photonic crystal is composed of a brush block copolymer.

The disclosed method wherein a two-component system is deposited followed by separation into two photonic crystal film and topcoat.

Results and Discussion

This disclosure details the union of a resin or laminate topcoat with a polymer-based photonic crystal film to produce a product with enhanced material and optical properties. These enhanced properties include but are not limited to resistance to moisture, resistance to ultraviolet radiation, resistance to high or low temperatures, resistance to solvent, increased hardness, increased ductility or malleability, increased optical clarity. We have added topcoats to photonic crystal films of varying reflection ($\lambda_{max}$) using the same topcoat (FIG. 2) and using different topcoat resins (FIG. 3). The photonic crystal films are produced via the self-assembly of poly(lactic acid)-b-poly(styrene) brush block copolymers, blended with linear polymer additives: poly(lactic acid) and poly(styrene) (J. Am. Chem. Soc. 2014, 136, 17374). However, this application is not limited to the specific resin topcoats detailed, the range of $\lambda_{max}$ reflection of the photonic crystals displayed, the architecture of the polymeric materials (brush, comb, network, tadpole, etc), or the specific chemical composition of the materials themselves.

Figure 2:
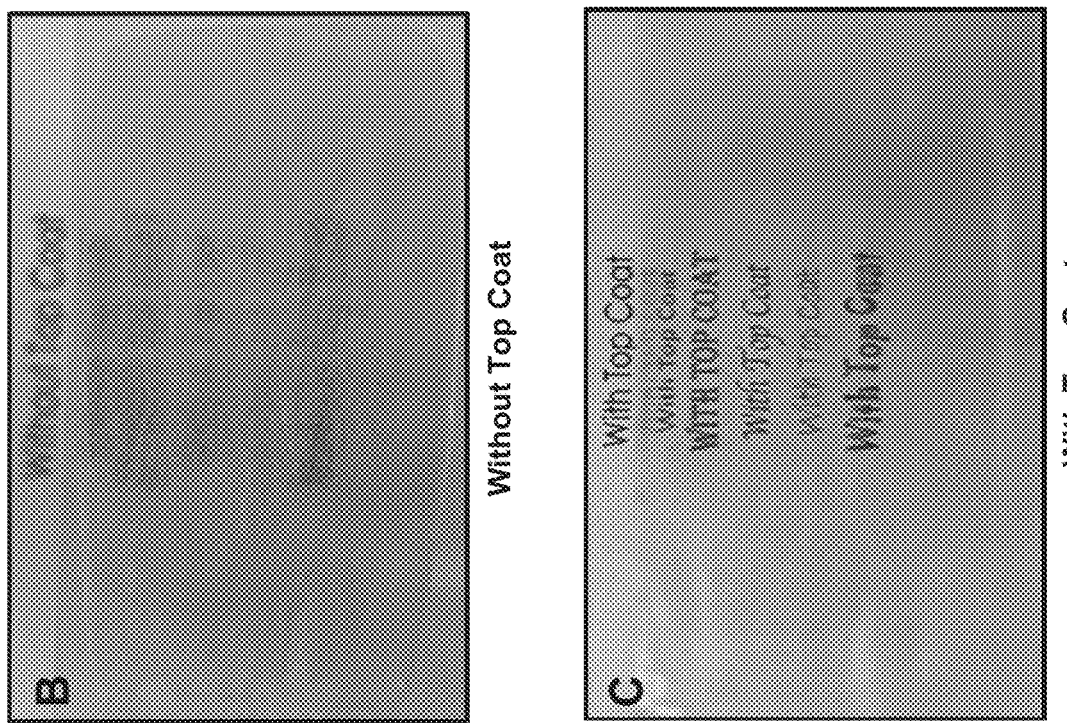
FIG. 2. Left: A, D, G, J) Graphs of the diffuse and total transmissions for photonic crystal coatings of various $\lambda_{max}$ reflections without a topcoat (dashed line) and using Sigma-Aldrich's UV curable resin as a topcoat (solid black line). On the right: B, E, H, K) pictures of photonic crystals without a topcoat next to their respective graph. C, F, I, L) pictures of photonic crystals with Sigma-Aldrich's UV curable resin as a topcoat next to their respective graph. Pictures were taken two inches above text "Without Top Coat" or "With Top Coat" to demonstrate clarity before and after.
Figure 2:
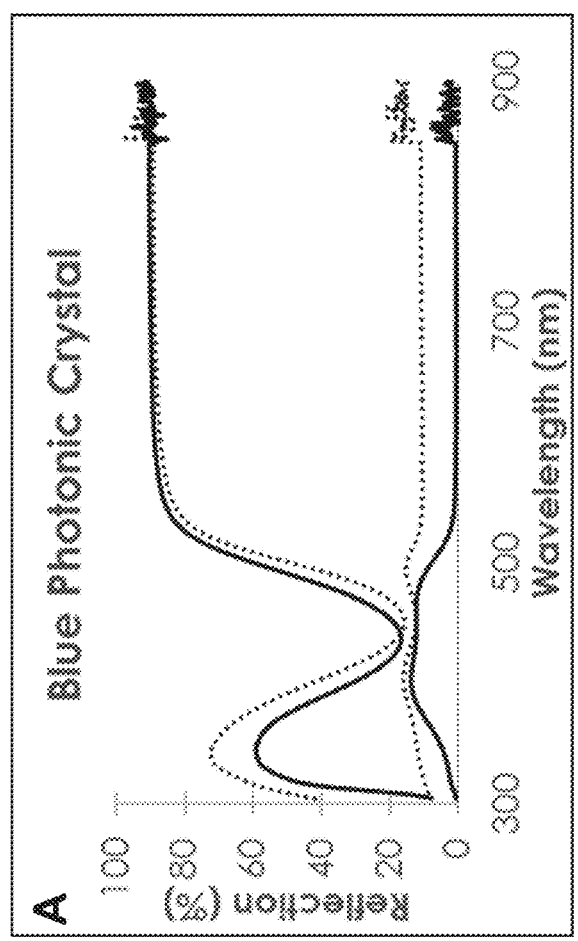
Figure 2:
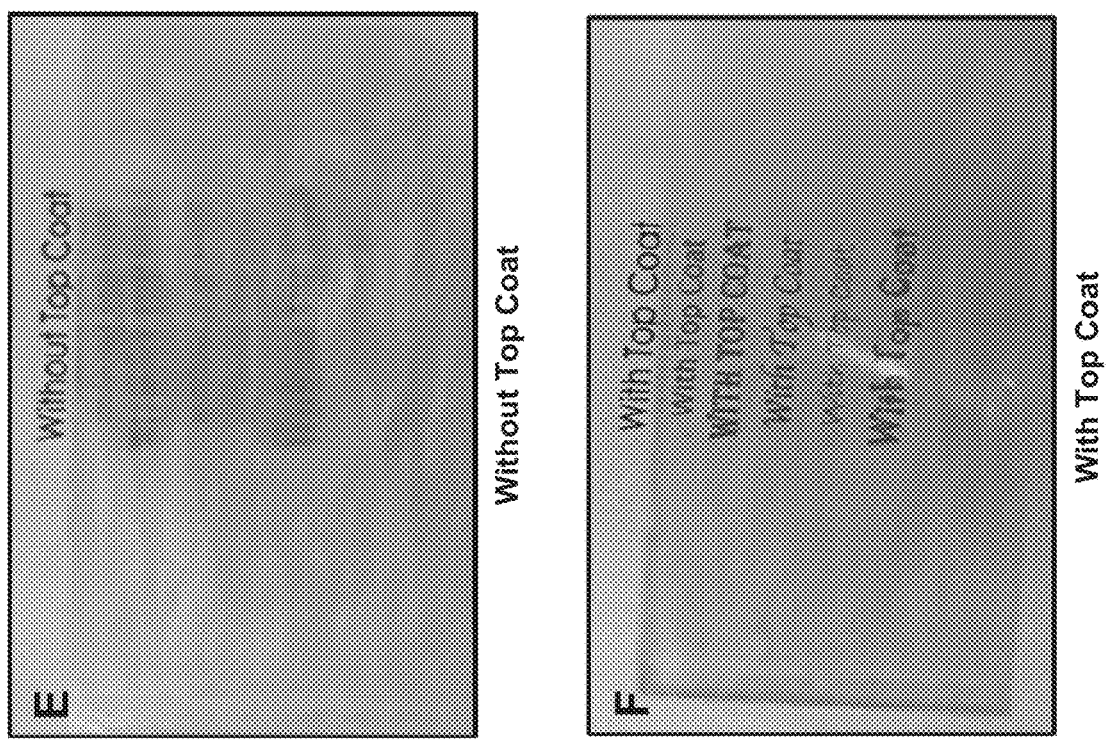
Figure 2:
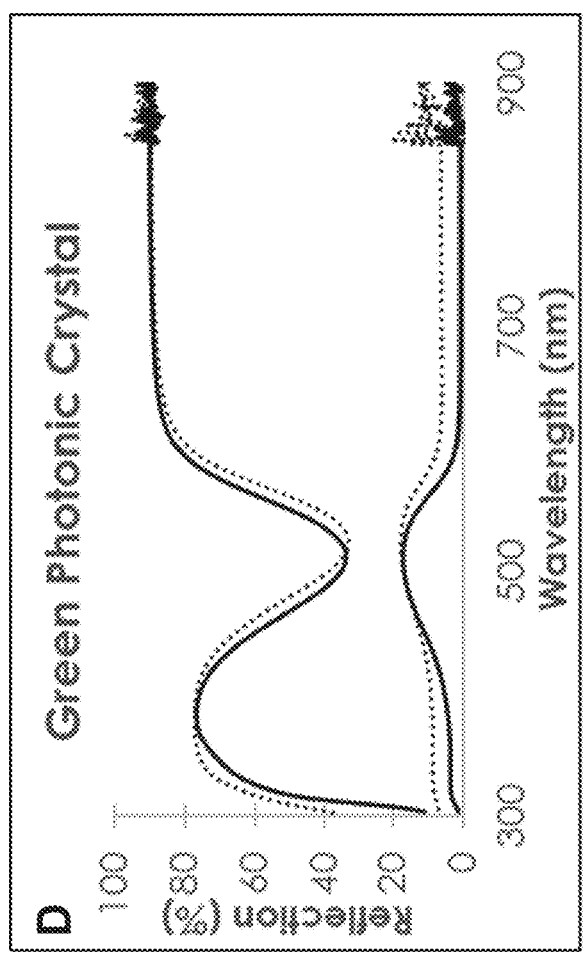
Figure 2:
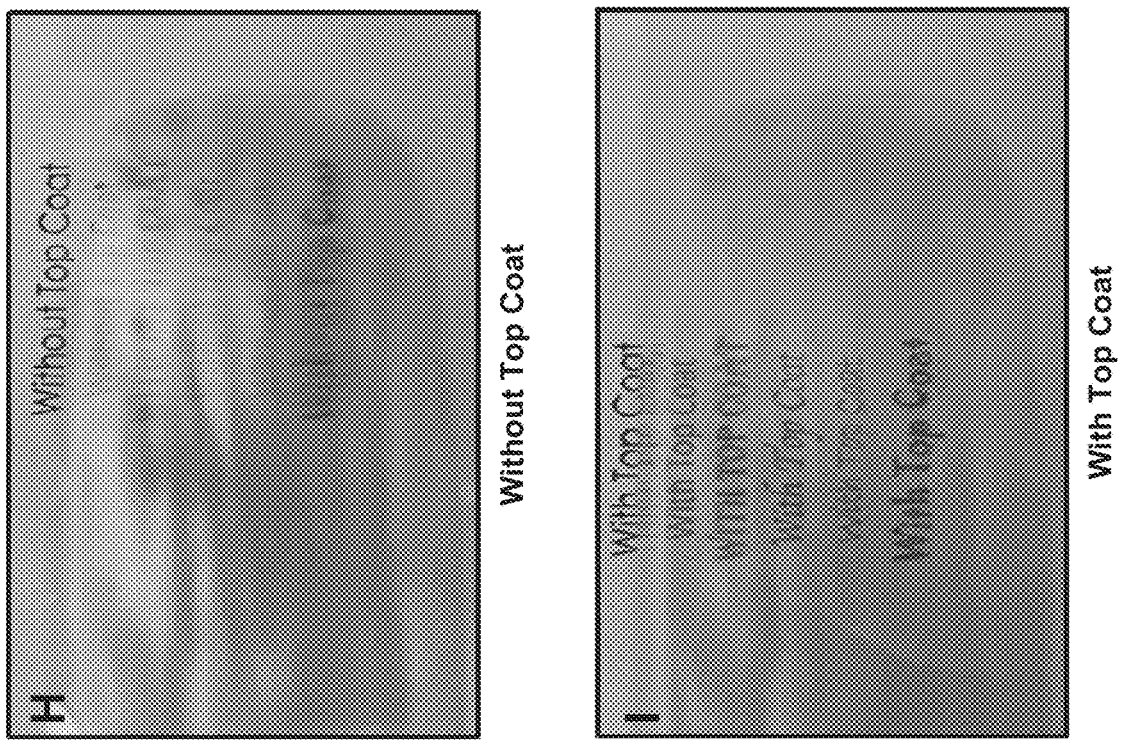
Figure 2:
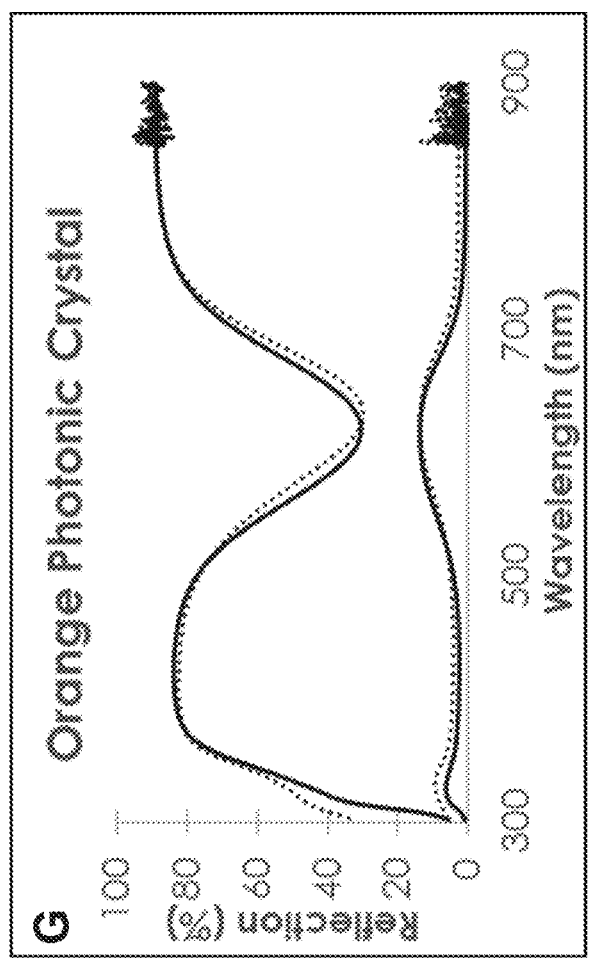
Figure 2:
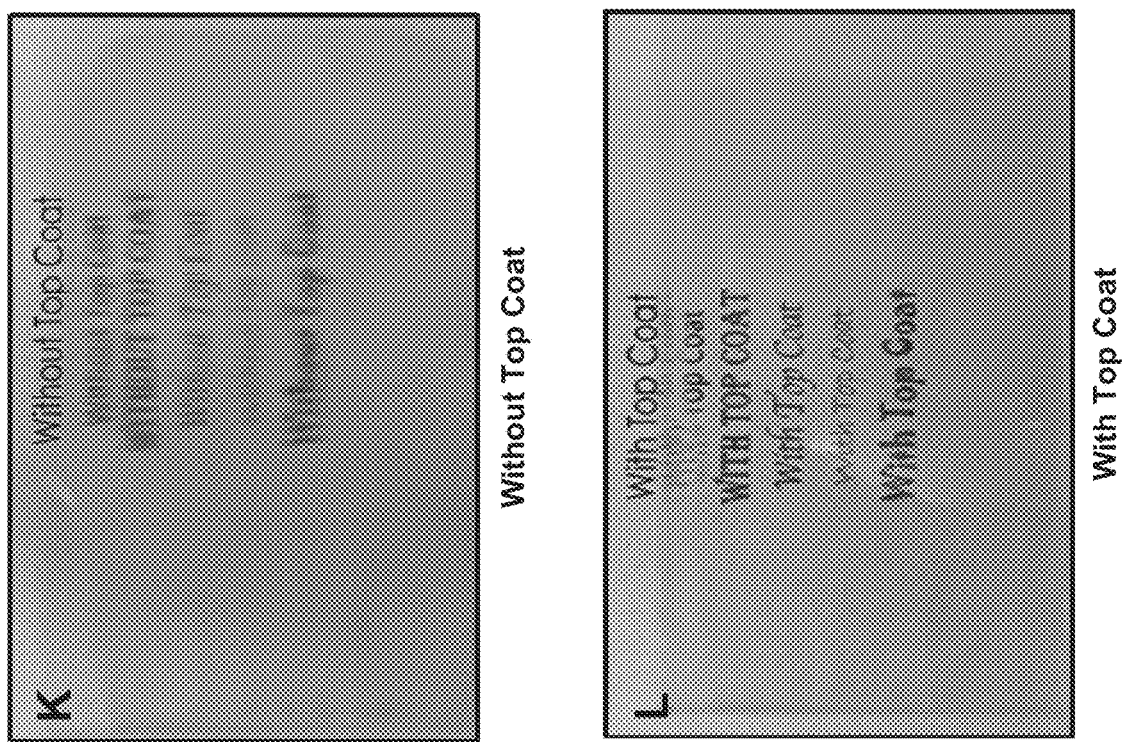
Figure 2:
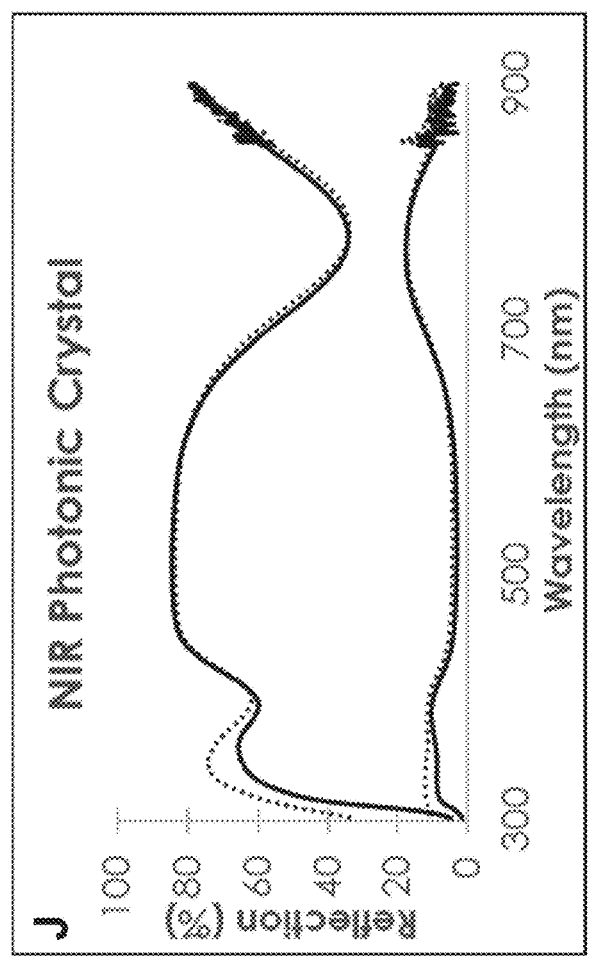
Figure 3:
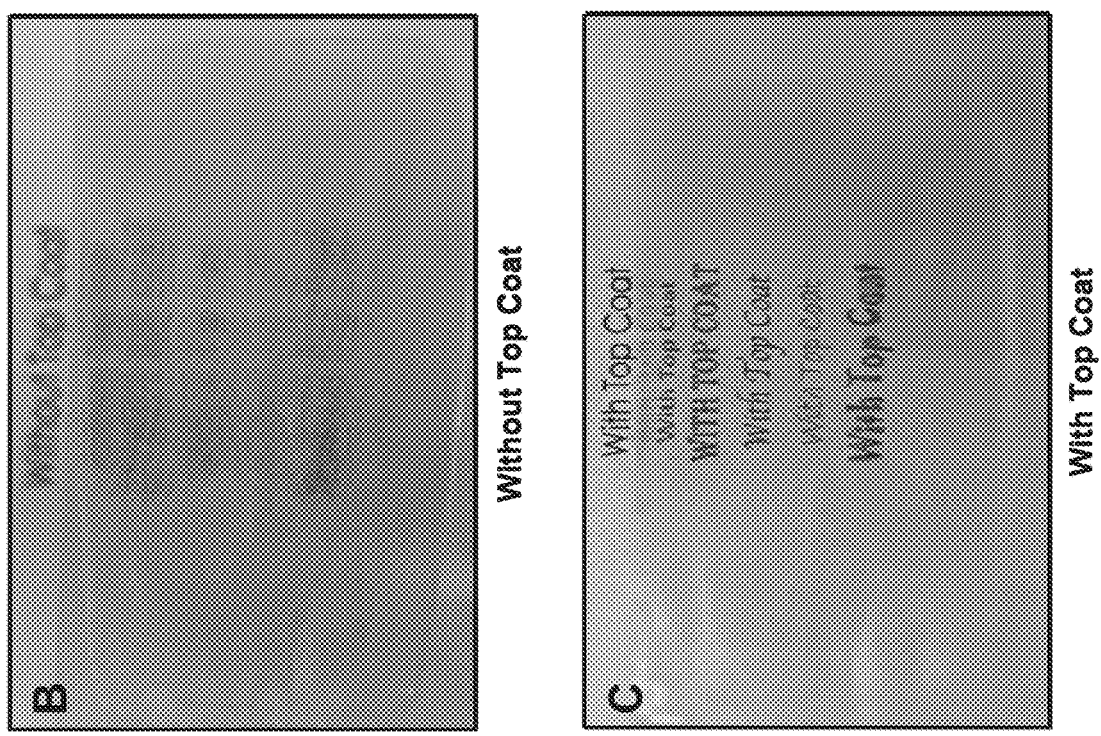
FIG. 3. On the left: A, D, G, J) Graphs of the diffuse and total transmissions for photonic crystal coatings without a topcoat (dashed line) and with various topcoats (solid black line). On the right: B, E, H, K) pictures of photonic crystals without a topcoat next to their respective graph. C, F, I, L) pictures of photonic crystals with a topcoat next to their respective graph. Pictures were taken two inches above text "Without Top Coat" or "With Top Coat" to demonstrate clarity before and after topcoat addition, respectively.
Figure 3:
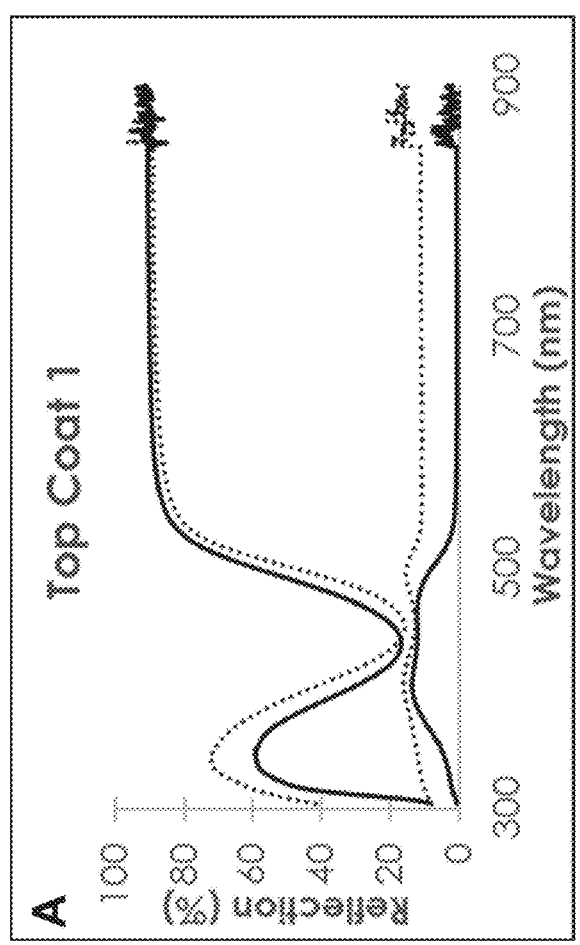
Figure 3:
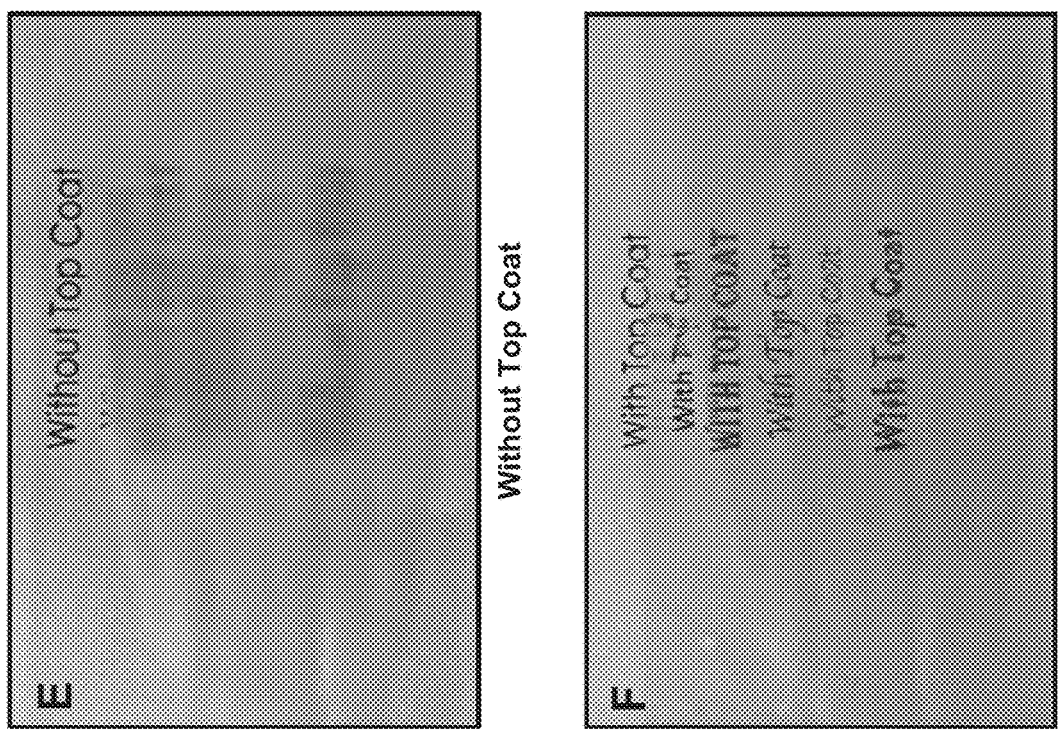
Figure 3:
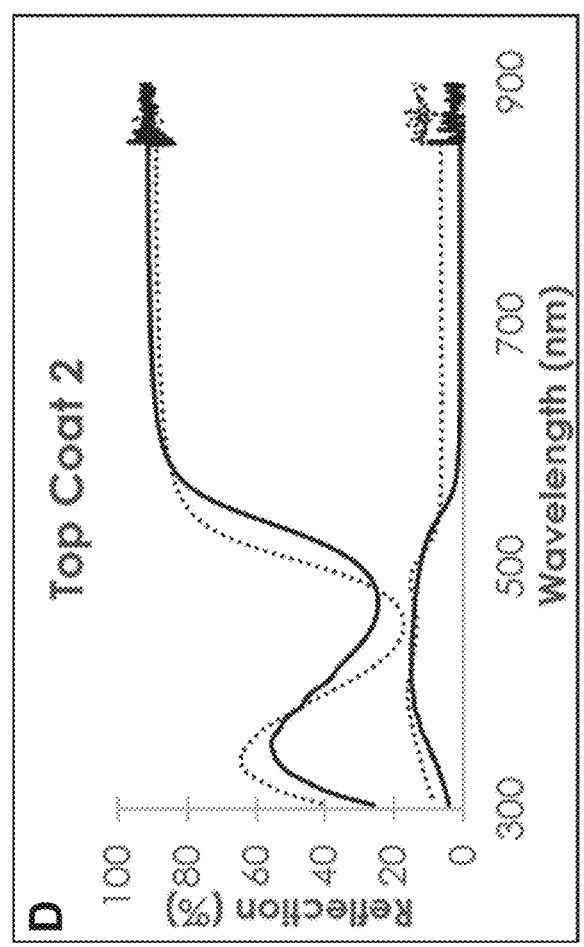
Figure 3:
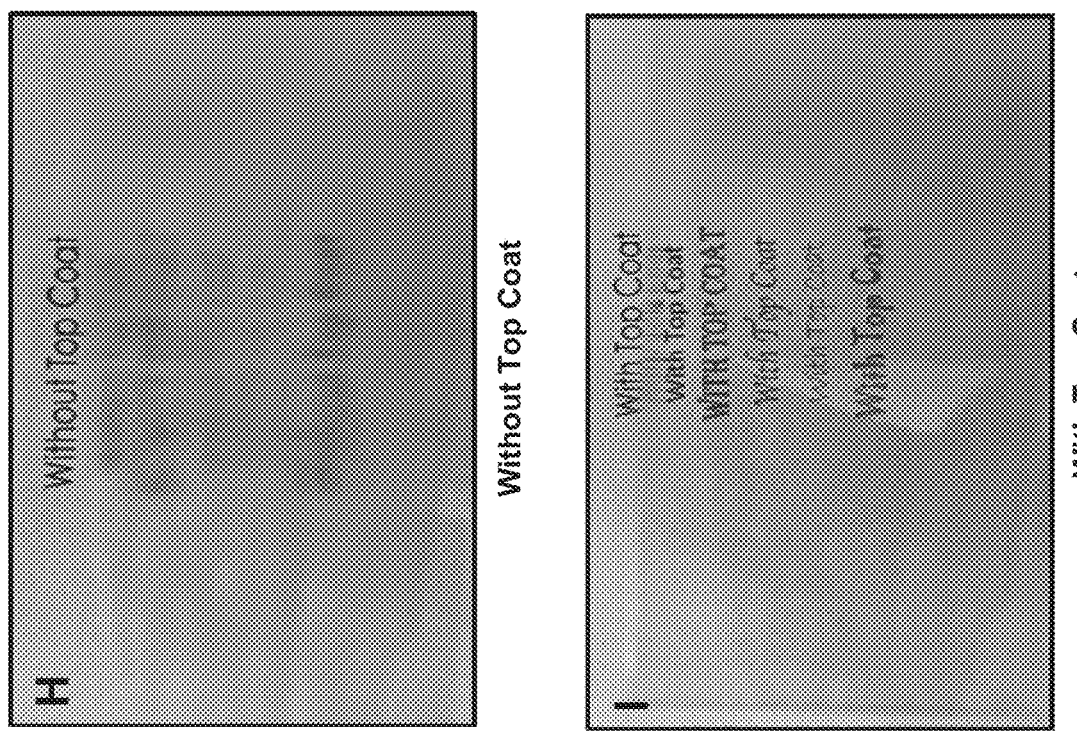
Figure 3:
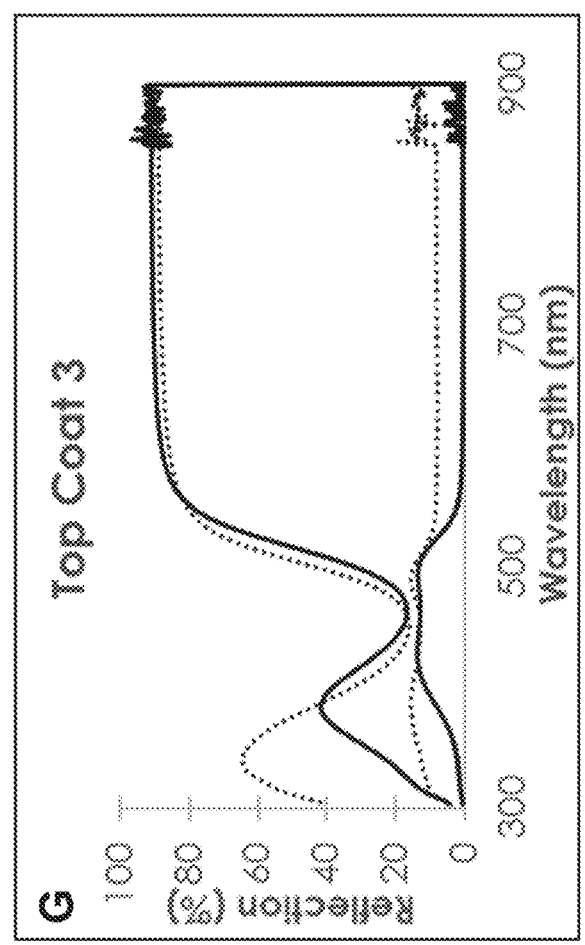
Figure 3:
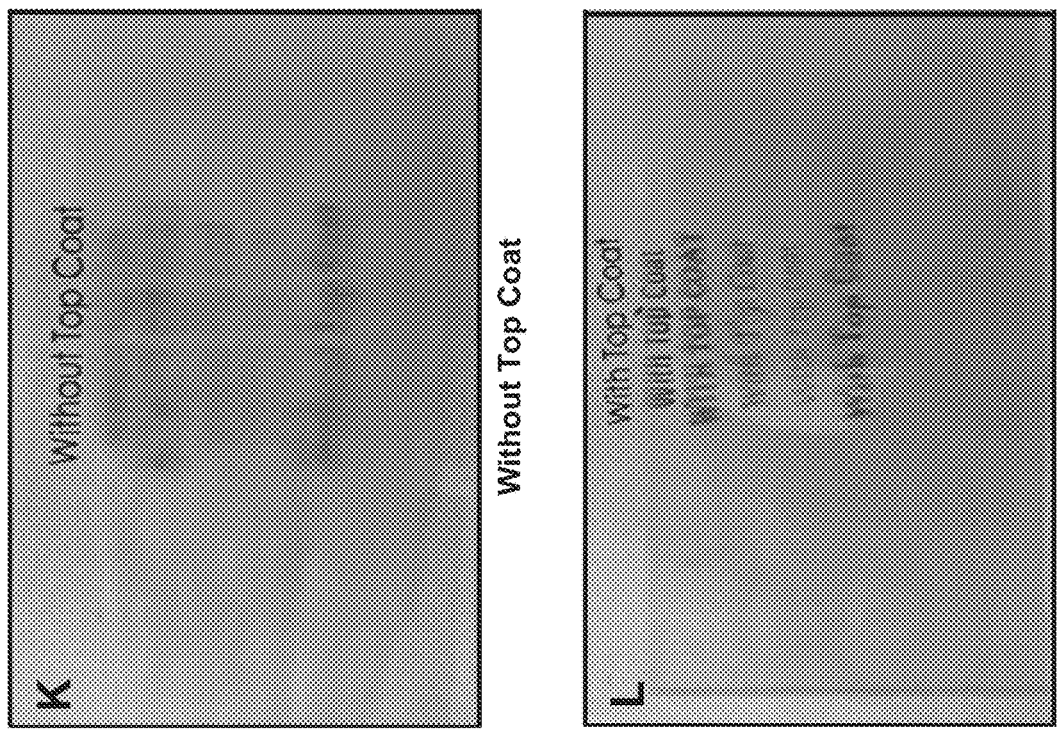
Figure 3:
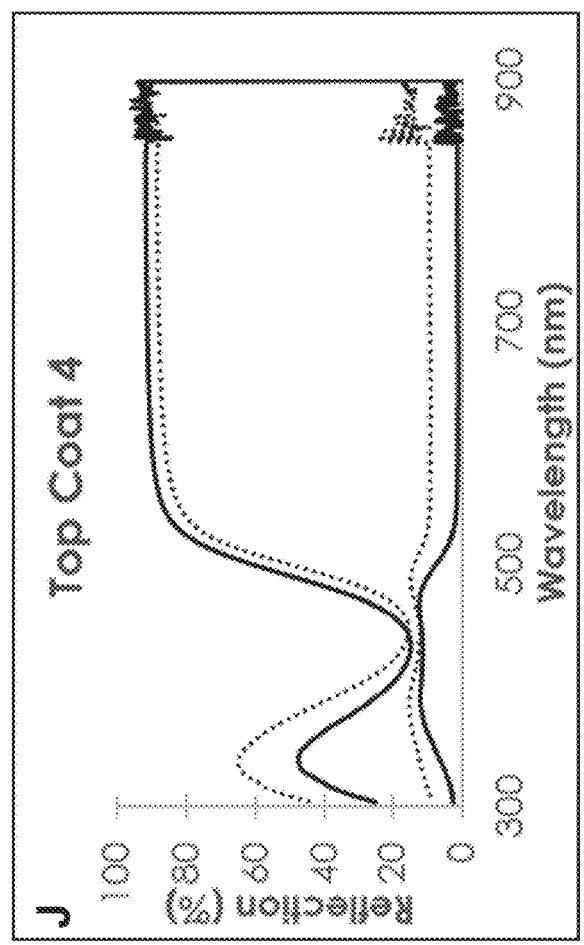
Figure 4:
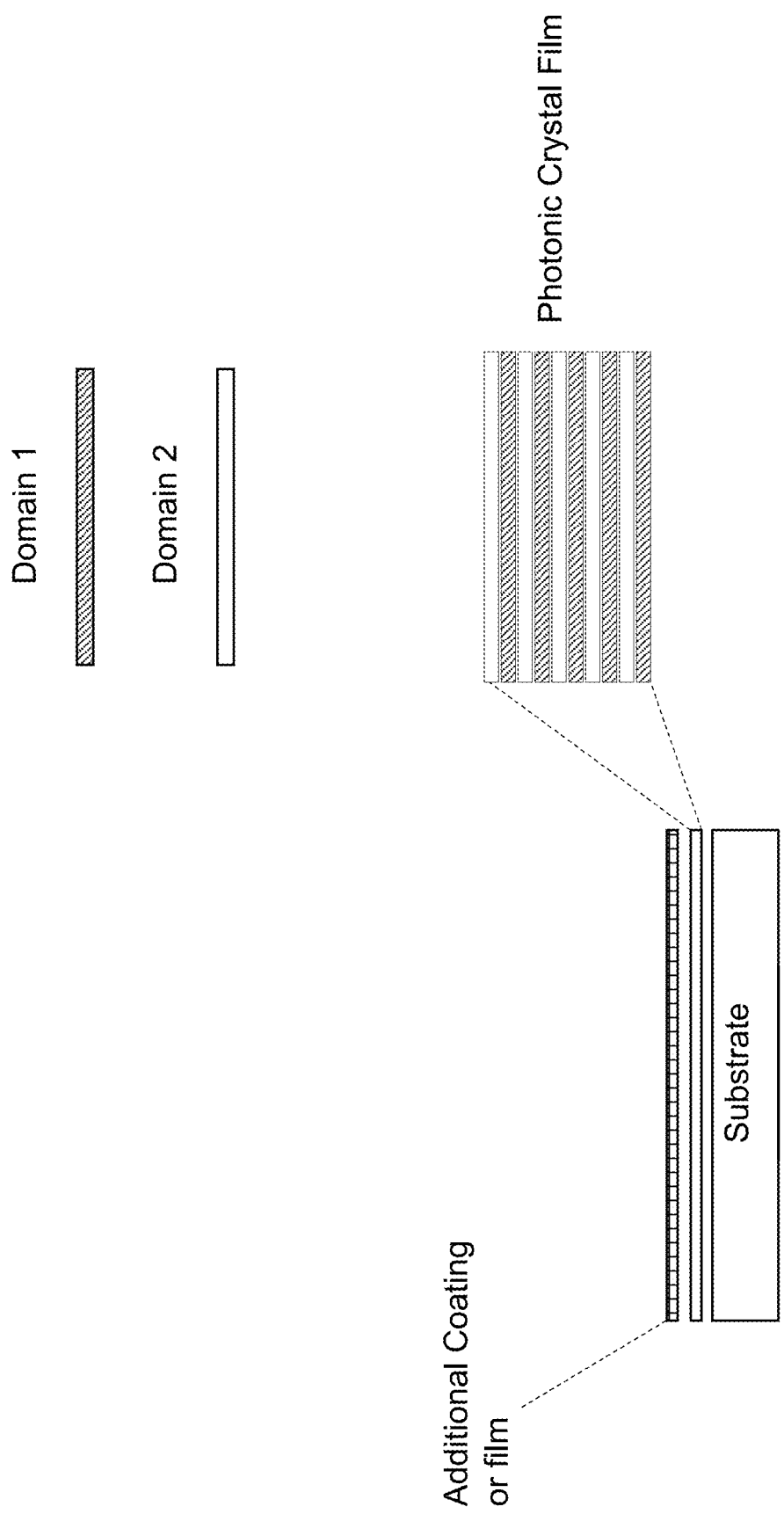
FIG. 4. Shows a multilayer coating on a substrate wherein domains 1 and 2 represent the different polymeric layers in the lamellar nanoscale morphology of the photonic crystal film (not drawn to scale).

The graphs in FIG. 2 and FIG. 3 demonstrate that the topcoat reduces haze regardless of topcoat identity. Haze is calculated using ASTM D1003 standards through eq. 1:

$$\% \text{ Haze} = \left(\frac{T_4}{T_2} - \frac{T_3}{T_1}\right) \times 100 \quad \text{Equation 1}$$

Where $T_1$ is the transmittance baseline of a diffuse reflectance accessory (DRA) on a UV-Vis-NIR spectrophotometer, $T_2$ is the total sample transmittance using a DRA on a UV-Vis-NIR spectrophotometer, $T_3$ is the Total instrument scattering of a DRA on a UV-Vis-NIR spectrophotometer, and $T_4$ is the total sample scattering using a DRA on a UV-Vis-NIR spectrophotometer. In a more simplified version, one can use eq. 2:

$$\% \text{ Haze} = \left(\frac{\text{Diffuse Transmission}}{\text{Total Transmission}}\right) \times 100 \qquad \text{Equation 2}$$

In the instance of FIG. 1A the visible haze (400 nm-700 nm) is reduced from 19.3% to 8.6% after addition of Sigma-Aldrich's UV curable resin topcoat. In the instance of FIG. 1B the visible haze is reduced from 15.5% to 10.2% after addition of Sigma-Aldrich's UV curable resin topcoat. In the instance of FIG. 1C the visible haze is reduced from 13.0% to 11.3% after addition of Sigma-Aldrich's UV curable resin topcoat. In the instance of FIG. 1D the visible haze is reduced from 9.8% to 8.2% after addition of Sigma-Aldrich's UV curable resin topcoat.

In the instance of FIG. 2B the visible haze is reduced from 17.3% to 13.4% after addition of Forms lab Clear resin (RS-F2-GPCL-04) topcoat. In the instance of FIG. 2C the visible haze is reduced from 18.4% to 10.5% after addition of Norland Optical Adhesives 68TH topcoat. In the instance of FIG. 2D the visible haze is reduced from 19.0% to 9.7% after addition of Norland Optical Adhesives 13825 topcoat.

Examples of compositions of the formulations described herein are shown in Table 1.

TABLE 1

Formulation Compositions.

| FIG. | BBCP (wt %) | Poly(styrene) Linear Polymer Additive (wt %) | Poly(lactic acid) Linear Polymer Additive (wt %) | Solvent* (wt %) |
|---|---|---|---|---|
| 2 A-C | 10.0 | 5.0 | 5.0 | 80.0 |
| 2 D-F | 10.0 | 5.0 | 5.0 | 80.0 |
| 2 G-I | 10.0 | 5.0 | 5.0 | 80.0 |
| 2 J-L | 10.0 | 5.0 | 5.0 | 80.0 |
| 3 A-C | 10.0 | 5.0 | 5.0 | 80.0 |
| 3 D-F | 10.0 | 5.0 | 5.0 | 80.0 |
| 3 G-I | 10.0 | 5.0 | 5.0 | 80.0 |
| 3 J-L | 10.0 | 5.0 | 5.0 | 80.0 |

*Solvent is 4-chlorobenzotrifluoride.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Materials and Methods

The compositions of the polymer composite materials were prepared from a brush block copolymer, a linear poly(lactic acid), a linear poly(styrene), or a combination thereof. For linear polymer additives see J. Am. Chem. Soc. 2014, 136, 17374. The disclosure of U.S. Publication No. 2018/0258230 in its entirety is incorporated herein by reference.

Polymer films were deposited on microscope glass slides, and reflectance and transmittance spectra were recorded on a Cary 5000 UV-Vis-NIR spectrophotometer with a diffuse reflectance accessory.

Linear Poly(Lactic Acid):

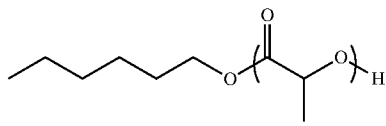

To a degassed, backfilled with nitrogen, and three times flame dried 200 mL Schlenk flask equipped with stir bar was added newly sublimed lactide (51.8 g), and tin(II) 2-ethylhexanoate, lastly anhydrous hexanol (1.948 mL) was syringed in. The reaction was heated to 135° C. As the reaction preceded lactide sublimed on the sidewalls of the flask which was melted with a heat gun back into solution to insure quantitative consumption of monomer. After 3.5 hours, the reaction was diluted with dichloromethane (DCM) and filtered through a celite plug and precipitated into methanol. Yield: 75%, $M_n$=3,050 Da, PDI=1.07.

Linear Poly(Styrene):

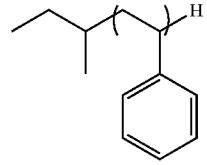

To a degassed, backfilled with nitrogen, and three times flame dried 1 L Schlenk flask equipped with stir bar was added dried and degassed Toluene (700 mL). The reaction flask was put in an ice bath and 1.4M sec-butyl lithium (25 mL, 2.24 g, 0.035 mol, 1 eq.) in cyclohexane was added to the stirring Toluene. After 20 minutes of the solution stirring, freshly dried over $CaH_2$ and distilled styrene (120 mL, 109 g, 1.05 mol, 29.9 eq.) was added by a 60 mL syringe in a fairly rapid fashion—no significant exotherm was observed, the solution immediately turned from clear to orange/red. After 2 hours ~50 mL of methanol was syringed in to quench the reaction.

Work up: The solution was concentrated in a rotary evaporator so that the remaining toluene, methanol, cyclohexane, and propylene oxide were removed. The polymer was dissolved in THF and precipitated at room temperature in a stirring methanol solution. Yield: 98%, $M_n$=3,100 Da, PDI=1.05.

Example 2. Brush Block Copolymer (BBCP) Synthesis

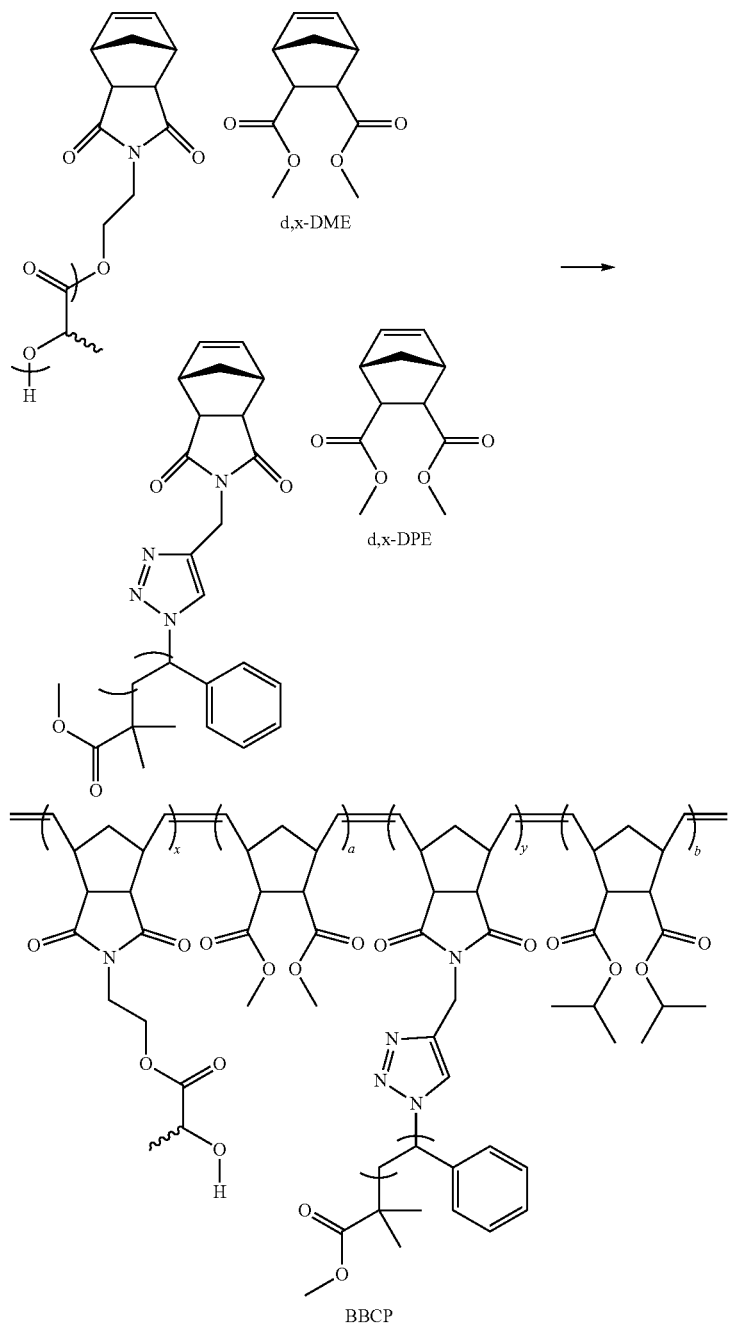

d = endo;
x = exo.

BBCP1 (see *J. Am. Chem. Soc.* 2017, 139, 17683): To a 30 mL brown vial containing PLA-MM (1173 mg, 0.325 mmol, $M_n$=3608 Da) and a stir bar was added a $CH_2Cl_2$ solution of d,x-DME (68.32 mg in 6.5 mL, 0.325 mmol, 0.05M). The copolymerization was initiated by addition of Grubbs' $3^{rd}$ generation catalyst (($H_2$IMes)-(pyr)$_2$(Cl)$_2$RuCHPh, 1.91 μmol) targeting PLA$_{170}$-r-DME$_{170}$. After stirring for 75 minutes at room temperature, an aliquot was extracted for analysis, and a $CH_2Cl_2$ solution of pyridine was added (3.8 mL, 1.0 mM). In a separate vial, the solution of the second block was prepared by dissolving PS-MM (1138 mg, 0.325 mmol, $M_n$=3500 Da) with a $CH_2Cl_2$ solution of d,x-DiPE (86.56 mg in 6.5 mL, 0.325 mmol, 0.05M). The second block was then introduced to the first block reaction mixture in one shot using a 12 mL plastic syringe. The resulting mixture was stirred at room temperature for an additional 12 h. The reaction was quenched by addition of 0.5 mL ethyl vinyl ether, and the block copolymer was isolated by precipitation into methanol at −78 C. $M_n$=1,020,000 Da, PDI=1.09. Yield: 92%.

Example 3. Topcoat Compositions

Topcoat A components (Sigma Aldrich's UV Curable Resin, product #: 900164):
  Mercapto polymerization reagent 50%-70%
    Specific Name: Pentaerythritol tetrakis(3-mercaptopropionate)
  Monomer crosslinker 10%-20%
    Specific Name: 2-Carboxyethyl acrylate
  Aromatic reducing agent 0.1%-1%
  Polymerization inhibitor 0.1%-1%
  Polymerization stabilizer 0.1%-1%
General Mechanism for application: thiol-ene chemistry.
Topcoat B components (Form Labs clear Resin, product #RS-F2-GPCL-04):
  a mixture of methacrylic acid asters and photoinitiators; comprising:
    Methacrylated oligomers
    Methacrylated monomer
    Photoinitiators
General mechanism for application: photo-generated radical curing.
Topcoat C components (Norland Optical Adhesives (NOA), product #68TH): ultraviolet and heat curing adhesive; urethane related resin-based formulation, and urethane related adhesives comprising:
  Mercapto ester 30%-55%
  Mercapto ester 35%-60%
  Tetrahydrofurfuryl methacrylate 5%-30%
General mechanism for application: thiol-ene chemistry.
Topcoat D components (NOA product #13825):
ultraviolet and visible light curing adhesive, acrylate related adhesives, comprising:
  Aliphatic urethane acrylate 85%-99%
  Acrylic monomer 1%-15% General mechanism for application: radical curing, urethane containing.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A multilayer coating comprising:
   a) a first layer of a photonic crystal film comprising a pigment and brush block copolymer (BBCP) of Formula IA or Formula IB:

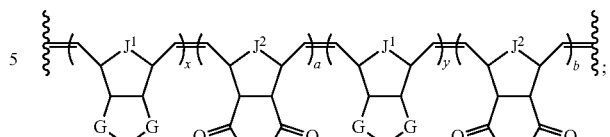

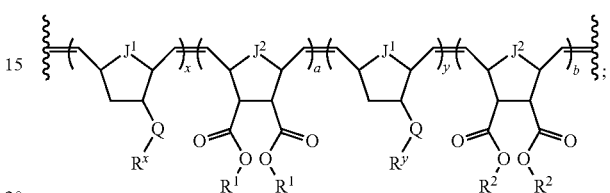

wherein
$R^x$ is —($C_2$-$C_6$)alkyl-OC(=O)$G^1$ wherein $G^1$ comprises polyacrylate, polymethacrylate or polylactic acid;
$R^y$ is —($C_1$-$C_8$)alkyl-$G^2$-$G^3$ wherein $G^2$ is —C(=O)O— or a nitrogen heterocycle and $G^3$ comprises polystyrene, polyacrylate, polydimethylsiloxane, polyether, polymethacrylate, or polylactic acid;
$R^1$ is unbranched alkyl;
$R^2$ is branched alkyl;
$J^1$ and G are each independently $CH_2$ or C=O;
each $J^2$ is independently $CH_2$ or C=O;
each Q is independently alkyl, cycloalkyl, heterocycloalkyl, aryl, or heteroaryl;
a and b are each independently 0 to about 1000; and
x and y are each independently 1 to about 1000;
  wherein blocks a, b, x and y are in any order, the ratio of x:a is 1:0 to about 1:3, and the ratio of y:b is 1:0 to about 1:3; and
b) a second layer comprising a topcoat wherein the topcoat is an optical adhesive or ultraviolet curable resin;
wherein the first layer and second layer form a multilayer film and the multilayer coating comprises one or more multilayer films.

2. The multilayer coating of claim 1 wherein the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, Azin dye, indophenol dye, oxazin dye, oxazone dye, thiazine dye, thiazole dye, safranin dye, xanthene dye, perylene diimide dye, rhodamine dye, or combination thereof.

3. The multilayer coating of claim 1 wherein the a and the b are each independently 1 to about 300.

4. The multilayer coating of claim 1 wherein the x and the y are each independently 1 to about 300.

5. The multilayer coating of claim 1 wherein the ratio of x:a is about 1:0.5 to about 1:1.

6. The multilayer coating of claim 1 wherein the ratio of y:b is about 1:0.5 to about 1:1.

7. The multilayer coating of claim 1 wherein the BBCP has a number average molecular weight of about 500 kDa to about 3000 kDa.

8. The multilayer coating of claim 1 wherein the weight percent of BBCP is about 50% to about 99.9% and the weight percent of the pigment is about 0.1% to about 10%.

9. The multilayer coating of claim 1 wherein the photonic crystal film further comprises a metal oxide, a linear polymer additive, or a combination thereof.

10. The multilayer coating of claim 1 wherein the photonic crystal film further comprises zirconium dioxide nanocrystals.

11. The multilayer coating of claim 1 wherein the BBCP of Formula I is a BBCP of Formula IC or Formula II:

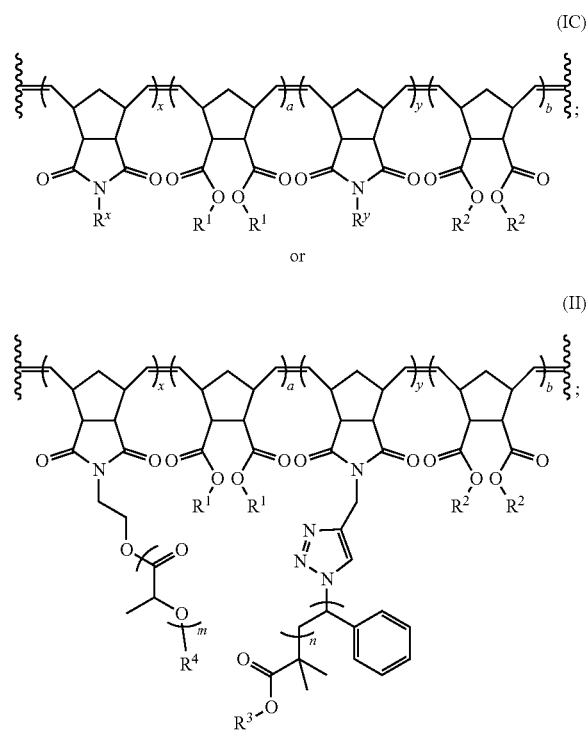

wherein

R$^3$ and R$^4$ are each independently H or unbranched or branched —(C$_1$-C$_6$)alkyl; and m and n are each independently 1 to about 100.

12. The multilayer coating of claim 11 wherein the m and the n are each independently 10 to about 50.

13. A method for forming a multilayer coating comprising:
  a) combining a solvent, a pigment and a brush block copolymer (BBCP) to form a mixture, wherein the BBCP is a BBCP of Formula IC:

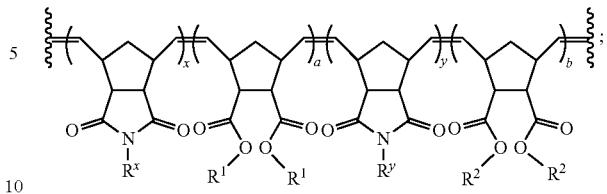

wherein
  R$^x$ is —(C$_2$-C$_6$)alkyl-OC(=O)G$^1$ wherein G$^1$ comprises polyacrylate, polymethacrylate or polylactic acid;
  R$^y$ is —(C$_1$-C$_8$)alkyl-G$^2$-G$^3$ wherein G$^2$ is —C(=O)O— or a nitrogen heterocycle, and G$^3$ comprises polystyrene, polyacrylate, polydimethylsiloxane, polyether, polymethacrylate, or polylactic acid;
  R$^1$ is unbranched alkyl;
  R$^2$ is branched alkyl;
  a and b are each independently 0 to about 1000; and
  x and y are each independently 1 to about 1000;
wherein the ratio of x:a is 1:0 to about 1:3 and the ratio of y:b is 1:0 to about 1:3;
  b) applying a first layer of the mixture to a substrate;
  c) drying the first layer to form a film; and
  d) applying a second layer comprising a topcoat to the film wherein the topcoat is an optical adhesive or ultraviolet curable resin;
  wherein the film and the second layer form the multilayer coating on the substrate.

14. The method of claim 13 wherein the pigment is an acid dye, basic dye, azo dye, acridine dye, rylene dye, sulfur dye, pH indicator, food dye, fluorescent brightener, anthraquinone dye, arylmethane dye, triarylmethane dye, phthalocyanine dye, quinone-imine dye, azin dye, indophenol dye, oxazin dye, oxazone dye, thiazine dye, thiazole dye, safranin dye, xanthene dye, perylene diimide dye, rhodamine dye, or a combination thereof.

15. The method of claim 13 wherein the mixture comprises the pigment in about 0.1% to about 3% by weight.

16. The method of claim 13 wherein the BBCP has a weight percent of about 2.5% to about 50% in the mixture.

17. The method of claim 13 wherein the BBCP has a number average molecular weight of about 500 kDa to about 3000 kDa.

18. The method of claim 13 wherein combining the solvent, the pigment and the BBCP to form a mixture further comprises adding to the mixture a metal oxide, a linear polymer additive, or a combination thereof.

19. The method of claim 13 wherein applying a layer of the mixture to a substrate comprises spray deposition, drawdown coating, slot die coating, screen printing, spray deposition, or paintbrush/roller of the mixture to the substrate.

* * * * *